US007715028B2

(12) United States Patent
Kawaura

(10) Patent No.: US 7,715,028 B2
(45) Date of Patent: May 11, 2010

(54) CARD TYPE MEMORY, IMAGE FORMING APPARATUS, AND STARTING METHOD THEREFOR

(75) Inventor: Hisanori Kawaura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1385 days.

(21) Appl. No.: 11/137,651

(22) Filed: May 26, 2005

(65) Prior Publication Data
US 2006/0001909 A1 Jan. 5, 2006

(30) Foreign Application Priority Data
May 27, 2004 (JP) ............................. 2004-158118

(51) Int. Cl.
*G06F 3/12* (2006.01)
*G06K 15/00* (2006.01)
(52) U.S. Cl. ..................... 358/1.13; 358/1.16; 358/1.17
(58) Field of Classification Search ................. 358/1.1, 358/1.9, 1.11–1.18, 404, 444, 501, 523, 524; 399/8, 83
See application file for complete search history.

(56) References Cited
U.S. PATENT DOCUMENTS

| 6,381,694 | B1 | 4/2002 | Yen |
| 2001/0034821 | A1 | 10/2001 | Hwang |
| 2003/0038968 | A1 | 2/2003 | Kawaura |
| 2003/0044185 | A1 | 3/2003 | Kawaura |
| 2003/0231343 | A1* | 12/2003 | Kobayashi et al. ......... 358/1.16 |
| 2004/0213588 | A1 | 10/2004 | Kawaura |
| 2004/0239975 | A1 | 12/2004 | Kawaura et al. |

FOREIGN PATENT DOCUMENTS

| EP | 1 292 102 A2 | 3/2003 |
| EP | 1 369 780 A1 | 12/2003 |
| EP | 1 376 346 A2 | 1/2004 |
| EP | 1 385 087 A2 | 1/2004 |
| EP | 1 387 264 A2 | 2/2004 |
| WO | WO 01/40946 A1 | 6/2001 |

OTHER PUBLICATIONS

"Memory Card Provides Boot Memory for Boot-Up Operation", Research Disclosure, Mason Publications, No. 326, XP-000206605, Jun. 1, 1991, p. 427.
"Concept of SPB-Linux 2", www.8UNG.AT, XP-002904340, Mar. 24, 2003, pp. 1-3.
"Booting", WIKIPEDIA.ORG, XP-002355021, May 13, 2004, papes 1-2.
Patent Abstracts of Japan, JP 2003-099313, Apr. 4, 2003.
Patent Abstracts of Japan, JP 2003-308253, Oct. 31, 2003.
Patent Abstracts of Japan, JP 2003-335028, Nov. 25, 2003.
Patent Abstracts of Japan, JP 2003-223386, Aug. 8, 2003.
Patent Abstracts of Japan, JP 2003-182191, Jul. 3, 2003.
Patent Abstracts of Japan, JP 2004-046801, Feb. 12, 2004.
Patent Abstracts of Japan, JP 2004-299389, Oct. 28, 2004.
Patent Abstracts of Japan, JP 2004-303209, Oct. 28, 2004.

* cited by examiner

*Primary Examiner*—Thierry L Pham
(74) *Attorney, Agent, or Firm*—Oblon, Spivak, McClelland, Maier & Neustadt, L.L.P.

(57) ABSTRACT

A card type memory includes a file system for use in an image forming apparatus, outside the file system, an operating system that starts a program installed in the image forming apparatus, an image formation program that executes image formation, and a start program that starts the program are also included in the card type memory outside the file system.

3 Claims, 27 Drawing Sheets

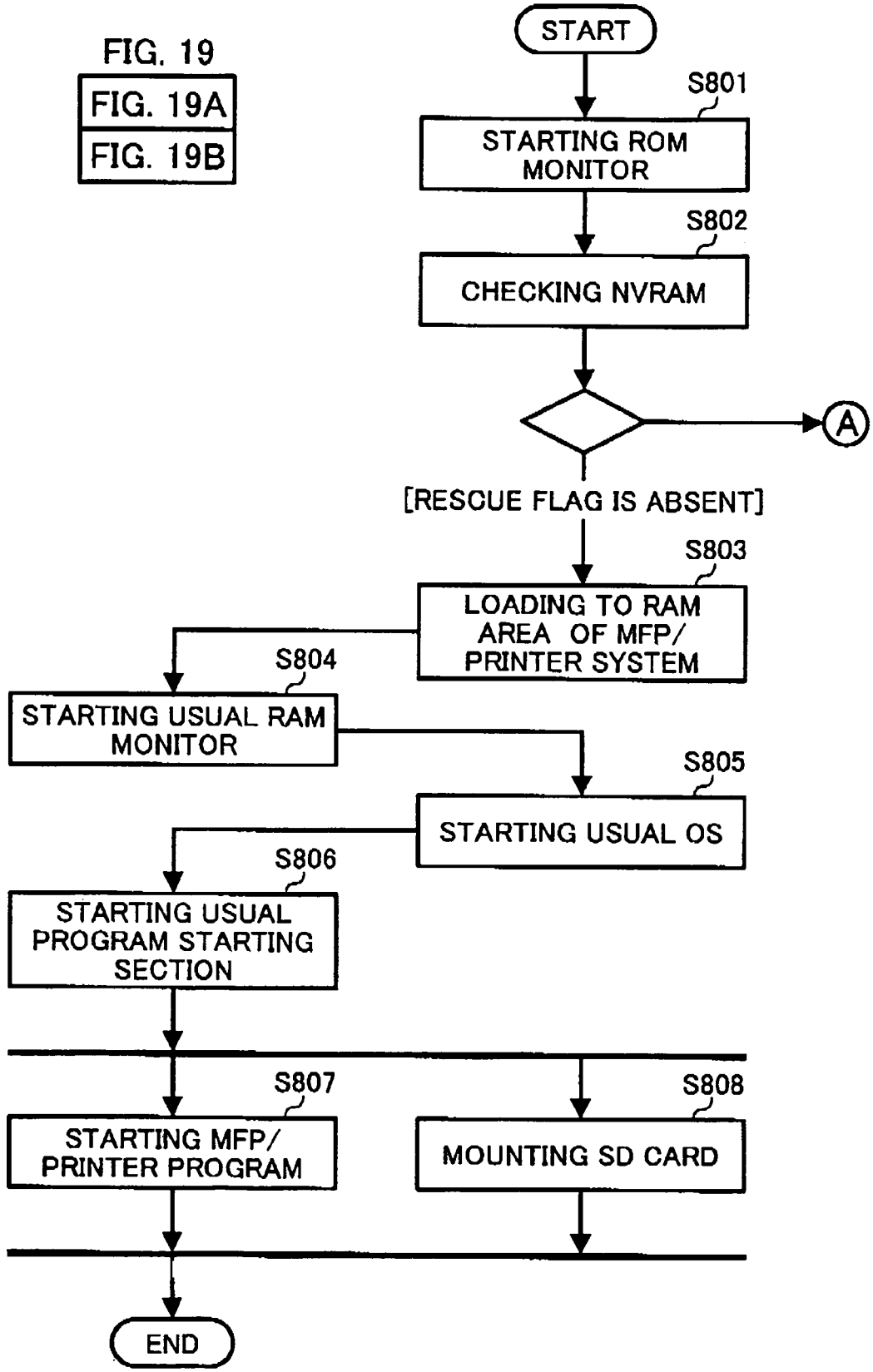

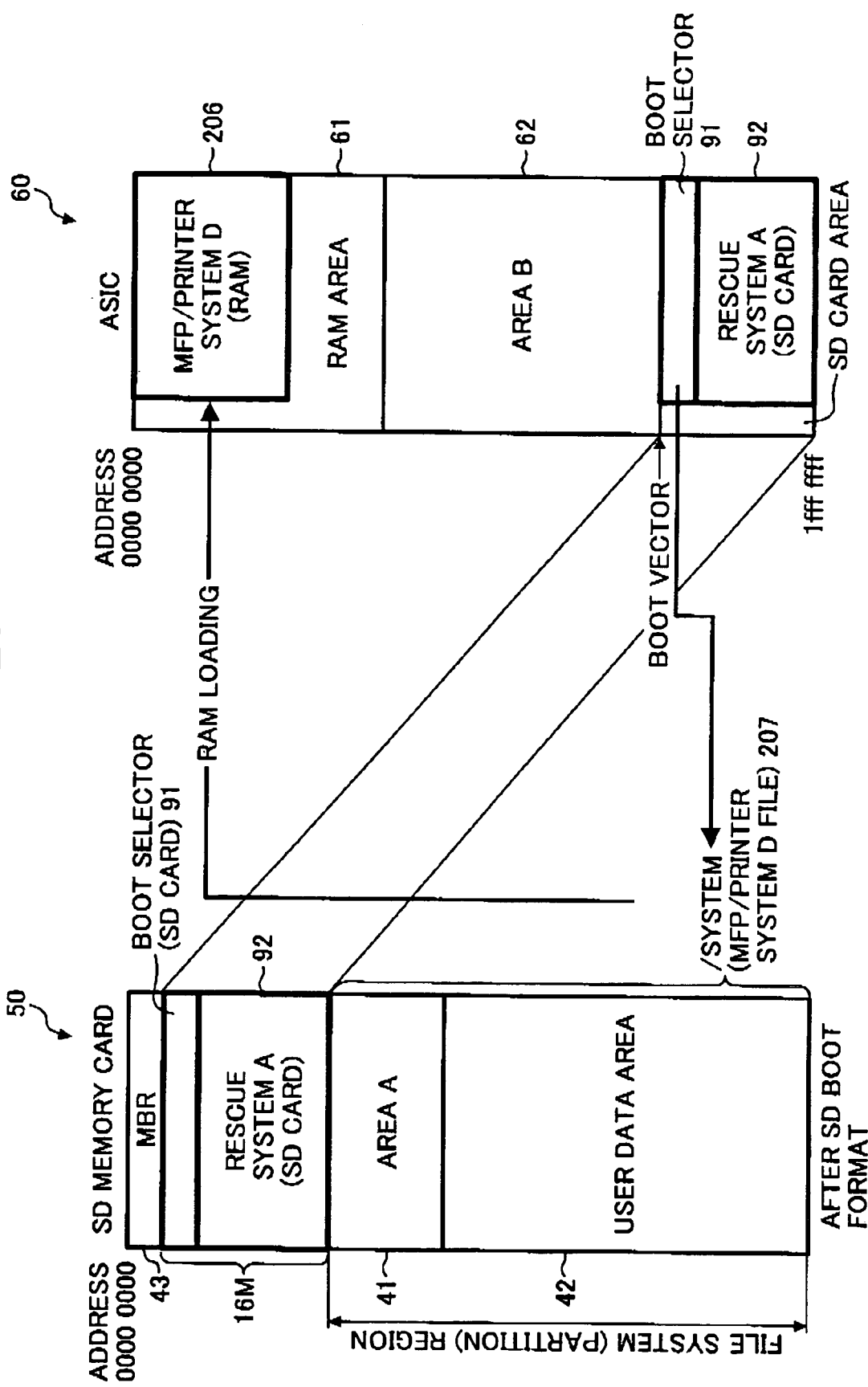

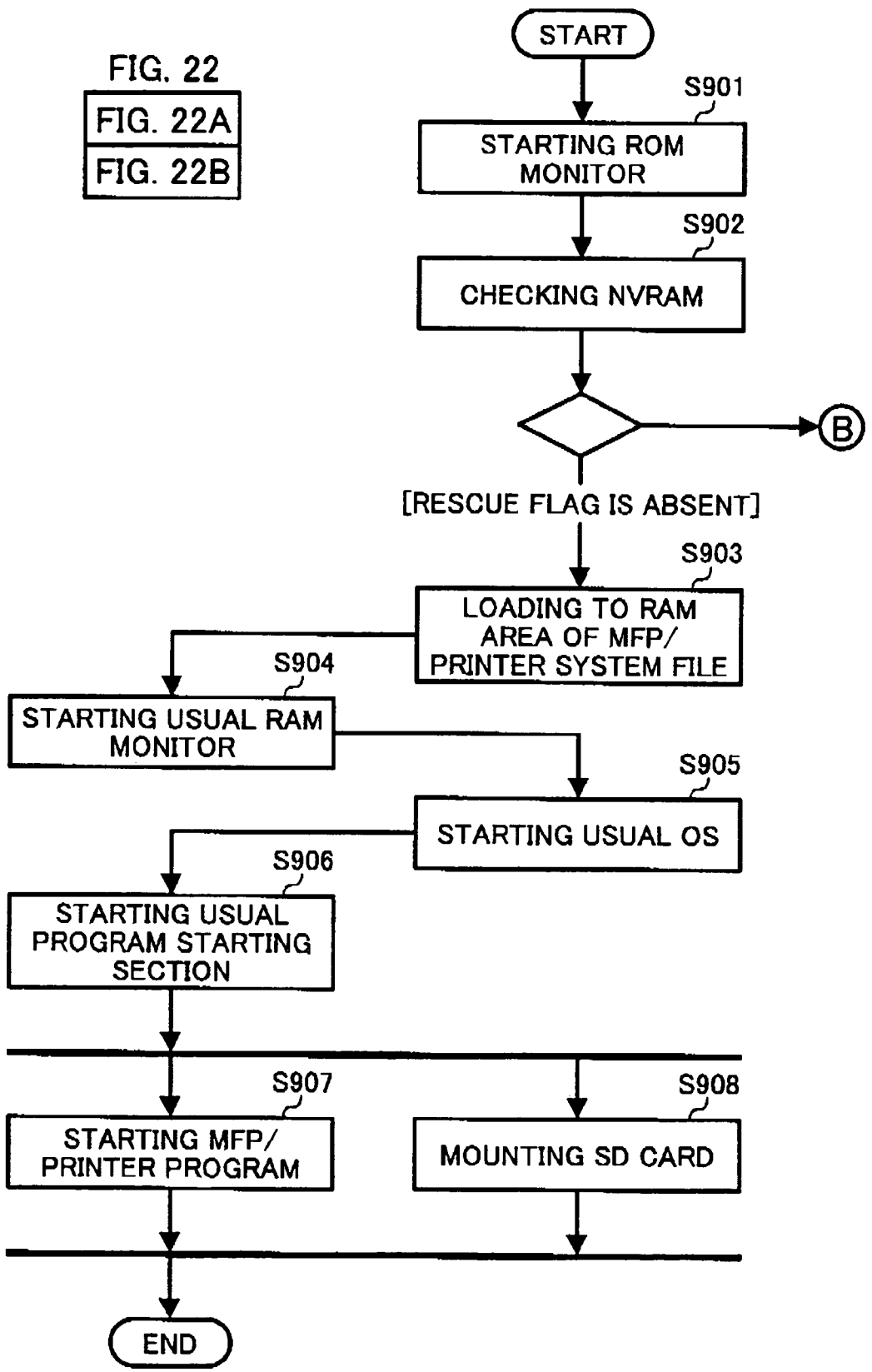

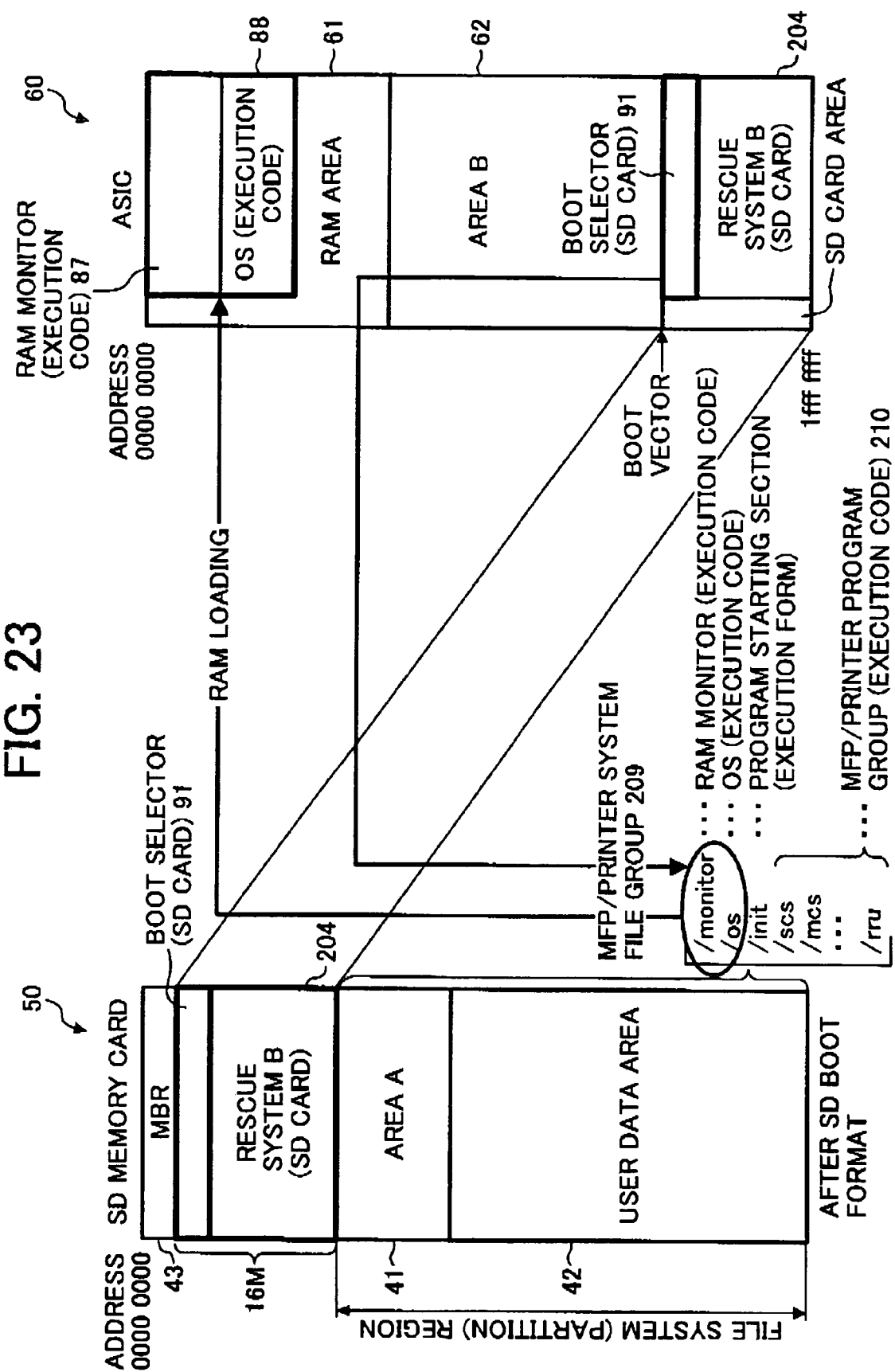

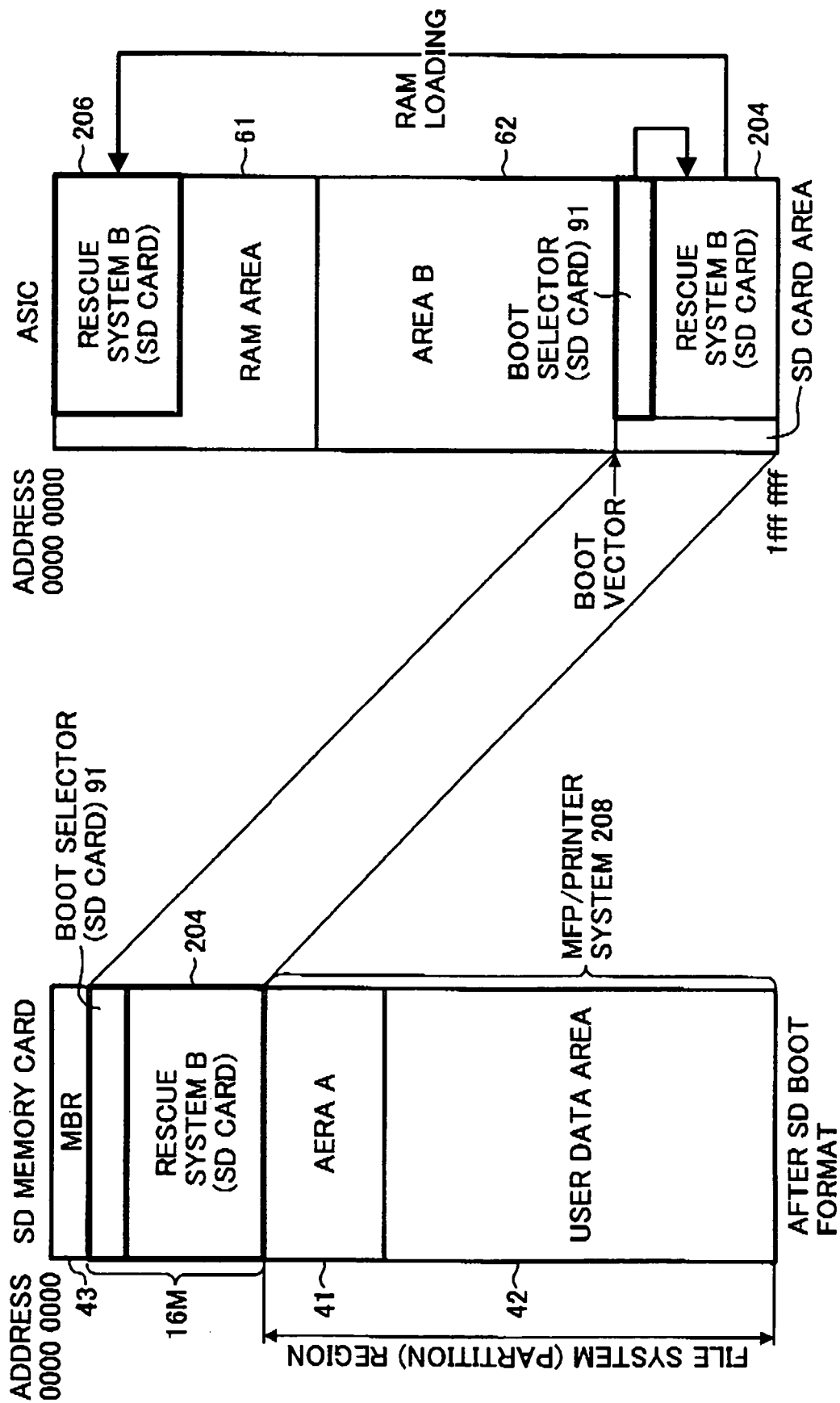

CARD TYPE MEMORY, IMAGE FORMING APPARATUS, AND STARTING METHOD THEREFOR

CROSS-REFERENCE TO RELATED APPLICATION

This application claims priority under 35 USC §119 to Japanese Patent Application No. 2004-158118 filed on May 27, 2004, the entire contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to a card type memory, an image forming apparatus, and a method for starting the image forming apparatus with the card type memory.

2. Discussion of Background Art

Recently, an image forming apparatus implements various functions, such as a facsimile, a printer, a copier, a scanner, etc. Such an image forming apparatus includes a display section, a printing section, and an image pickup section, and correspondingly stores four types of applications. Thus, the image forming apparatus can serve as the facsimile, the printer, the copier, and the scanner in accordance with the application.

Program operating the image forming apparatus is updated, but sometimes rewriting thereof results in failure. Then, a rescue system is stored in a Flash-ROM and executes recovery.

Such a Flash-ROM is mapped to a memory in an ASIC installed in the image forming apparatus as shown in FIG. 1. Specifically, sixteen Mega bytes of the memory are assigned to the Flash-ROM.

However, since a size of program including the rescue system increases, a card type memory of a cheap unit price is utilized instead of the Flash-ROM.

Thus, an ASIC can use a card type memory as a substitute of the Flash-ROM using a memory emulation function to map a memory of the card type memory in the ASIC.

However, when a SD (Secure Digital Memory) card is used as a card type memory, the SD card is ruled by a SDA to include one FAT file system, and cannot be simply used as a memory such as a Flash-ROM while omitting the FAT file system.

Further, since the above-mentioned memory excluding the FAT file system is advantageous in suppressing careless file deletion, it is not preferable that all of processing is dealt by the FAT file system.

In such a way, a conventional card type memory is inefficiently utilized.

SUMMARY

Accordingly, an object of the present invention is to address and resolve the above-noted and other problems and provide a new card type memory, an image forming apparatus, and an image forming apparatus starting method using the card type memory that stores program arranged to efficiently use the card type memory. Such a new and noble card type memory includes a file system for use in an image forming apparatus, which stores, outside the file system, an operating system configured to start a program installed in the image forming apparatus, an image formation program configured to execute image formation, and a start program configured to start the program.

In another embodiment, a card type memory includes a file system for use in an image forming apparatus which stores, outside the file system, an operating system configured to start a program installed in the image forming apparatus, a rescue program configured to recover program of the image forming apparatus, and a rescue start program configured to start the rescue program.

In yet another embodiment, an operating system for operating program installed in the image forming apparatus, an image formation program for executing image formation, and the start program are stored outside the file system.

In yet another embodiment, the image formation program for executing image formation, and the start program for starting the program are stored inside the file system.

In yet another embodiment, a boot loader program is stored to start the image forming apparatus.

In yet another embodiment, an interface is included in the card type memory.

In yet another embodiment, a first memory device is included to map a region outside the file system.

In yet another embodiment, a second memory device is included to allow expansion of the program stored in the file system of the first memory device or the card type memory.

In yet another embodiment, a file system-mounting device is included to mount the file system of the card type memory.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 9 illustrates a conventional start sequence;

FIGS. 19A and 19B collectively illustrates an exemplary start sequence;

FIG. 20 illustrates an exemplary memory map in which a MFP/printer system and a rescue system are arranged inside and outside the file system, respectively;

FIGS. 22A and 22B collectively illustrates an exemplary start sequence;

FIG. 23 illustrates still another exemplary memory map in which a MFP/printer system and a rescue system are arranged inside and outside the file system, respectively;

FIG. 25 illustrates still another exemplary memory map in which a MFP/printer system and a rescue system are arranged inside and outside the file system, respectively.

DESCRIPTION OF PREFERRED EMBODIMENTS

Figure 1:
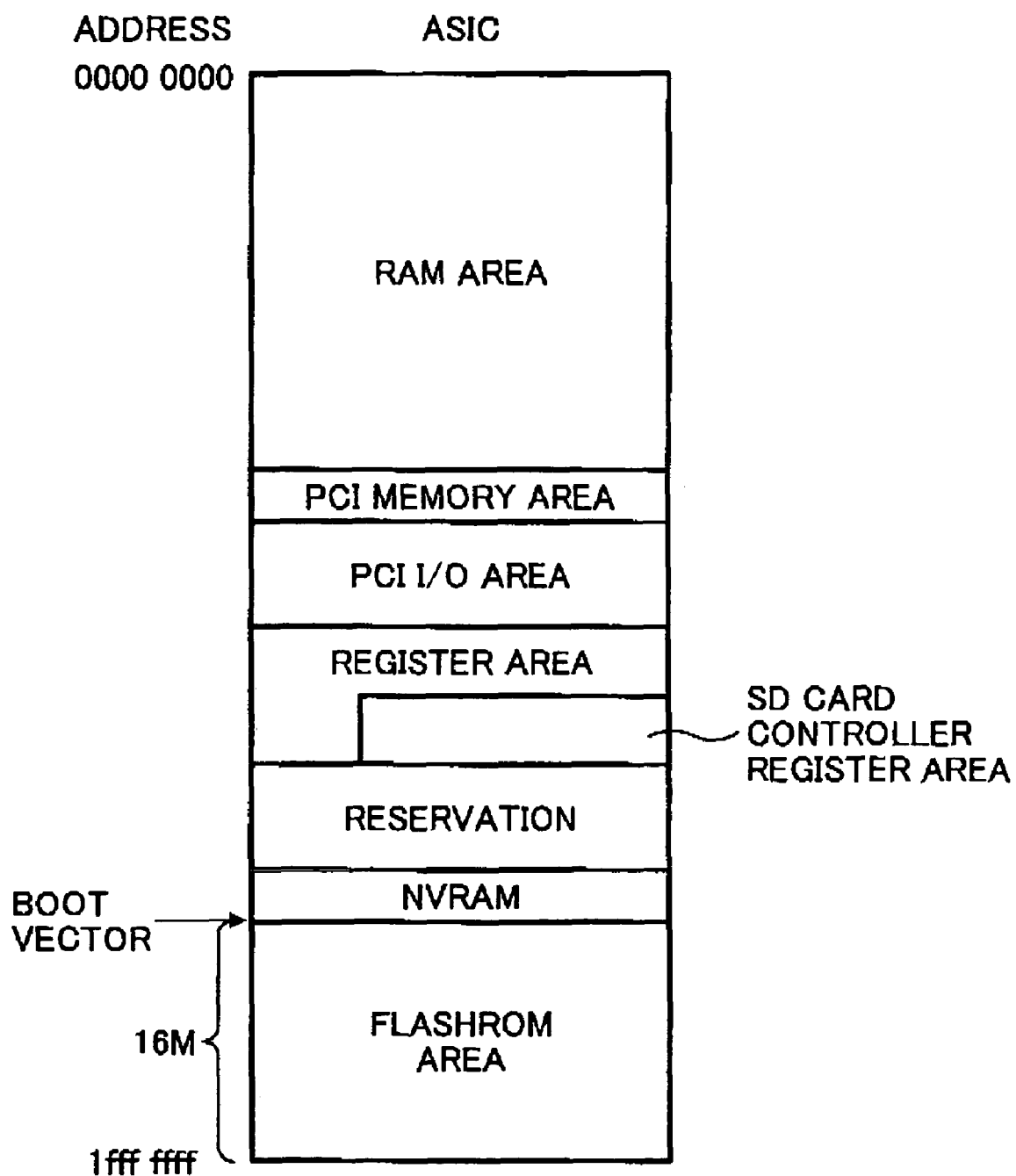
FIG. 1 illustrates an exemplary memory map of an ASIC.

Referring now to the drawings, wherein like reference numerals and marks designate identical or corresponding parts throughout several figures, wherein an image forming apparatus is exemplified by a MFP, and a SD card is used as a card type memory.

Figure 2:
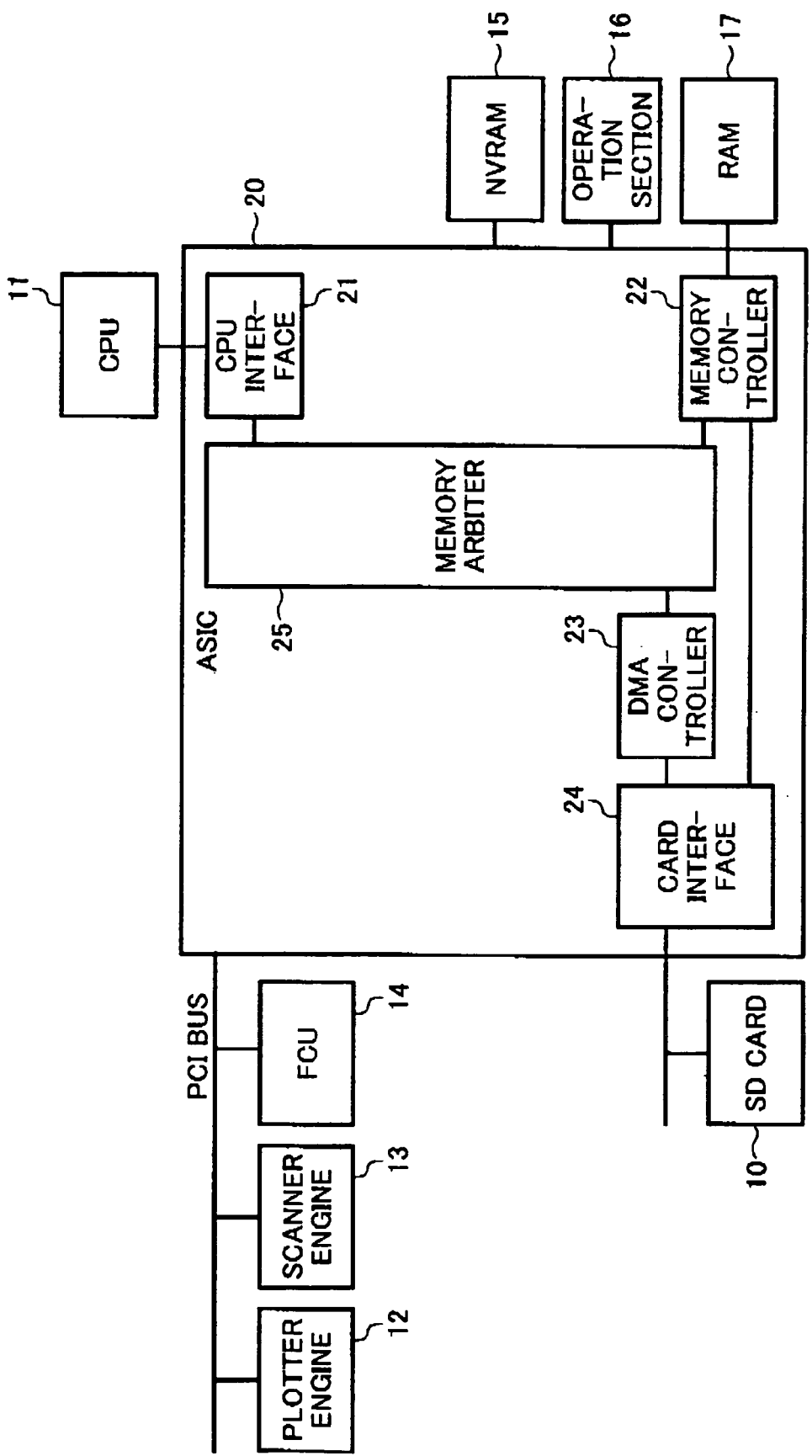
FIG. 2 illustrates an exemplary system configuration of an image forming apparatus (e.g. a MFP)

FIG. 2 illustrates an exemplary configuration of an image forming apparatus. As shown, an ASIC 20, a CPU 11, a plotter engine 12, a scanner engine 13, a facsimile control unit (FCU) 14, a SD card 10, a non-volatile RAM (NVRAM) 15, an operation section 16, and a RAM 17 are included in the MFP.

The ASIC 20 servers as an IC for image processing use in cooperation with hardware elements. The CPU 11 generally controls the MFP. The FCU 14 is a unit for facsimile use. The scanner engine 13 reads an image. The plotter engine 12 executes printing. The SD card 10 is a media having the same size as a stamp, and is recently capable of recording massive contents by one Giga bytes at maximum. The NVRAM 15 stores various data. The operation section 16 receives inputs from a user and gives a display to the user. The RAM 17 stores various program and data.

The ASIC 20 is formed from a CPU interface 21, a memory arbiter 25, a memory controller 22, a direct memory access (DMA) controller 23, and a SD card interface 24.

The CPU interface 21 interfaces with the CPU 11 and the ASIC 20. The memory controller 22 controls data communications between the RAM 17 and the ASIC 20. The DMA controller 23 controls data communications between the memory arbiter 25 and the SD card interface 24. The SD card interface 24 serves as an interface of the SD card 10.

Figure 3:
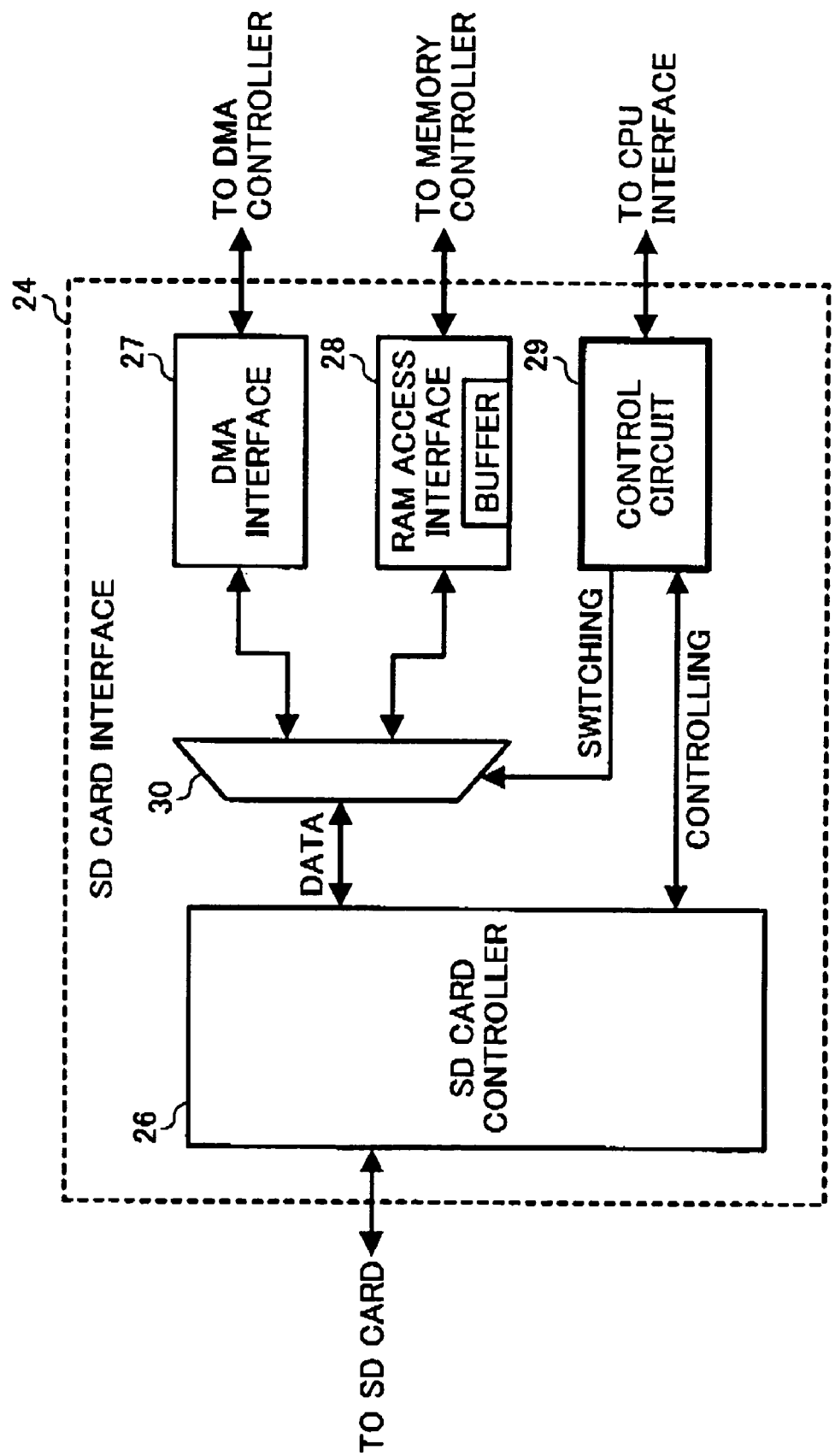
FIG. 3 illustrates an exemplary SD card interface.

Referring now to FIG. 3, the SD card interface 24 is described more in detail. As shown, the SD card interface 24 is formed from a SD control circuit 26, a DMA interface 27, a RAM access interface 28, a selector 30, and a control circuit 29.

The SD control circuit 26 directly controls the SD card and reads data therefrom and writes data thereto. The control circuit 29 controls the SD control circuit 26, communicates with the CPU interface, and switches the selector 30.

The DMA interface 27 communicates with the DMA controller 23. The RAM access interface 28 includes a buffer and communicates with the memory controller 22. The selector 30 switches output and input destinations to and from the SD control circuit 26 between DMA interface 27 and the RAM access interface 28.

Figure 4:
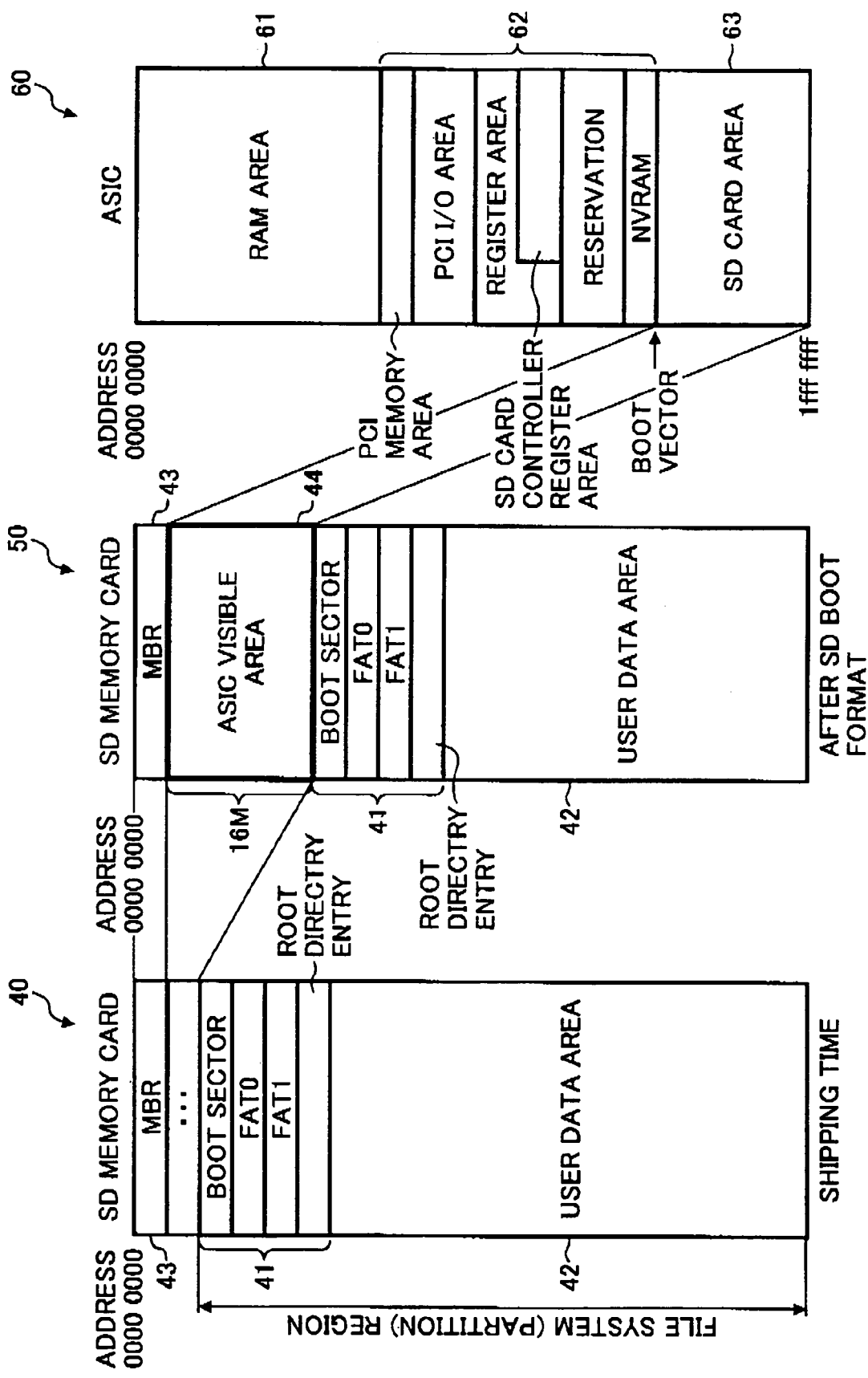
FIG. 4 illustrates exemplary memory maps of the ASIC and the SD card.

Now, a memory map of the ASIC and the SD card are described with reference to FIG. 4. As shown, a pair of memory maps 40 and 50 of two SD cards and a memory map 60 of an ASIC are illustrated. The memory map 40 is a memory map of the SD card at the time of shipping thereof.

As shown, a MBR (Master Boot Record), a Boot Sector, a FAT0, a FAT1, a Root Directory Entry, a User datan area are illustrated in a memory map 40. Among those, a range from the Boot Sector to the Root Directory Entry is represented herein after as an area A.

A memory map 50 of a SD card includes an area 44 having sixteen Mega bytes visible from an ASIC in addition to the memory map 40. As shown, the ASIC visible area 44 is arranged between the MBR 43 and the area A41. A leading address of the area A41 corresponds to that of the User Datan area 42 of the memory map 40.

The ASIC visible area 44 is mapped to an SD card area 63 formed in the memory map 60.

A RAM area 61, a PCI memory area, a PCI-I/O area, a register area, a reservation area, a NVRAM use area, and a SD card area 63 are illustrated in the memory map 60. A SD card controller register area is also provided in the register area. Herein after, an area ranging from the PCI memory area to the NVRAM use area is represented as an area B.

Figure 5:
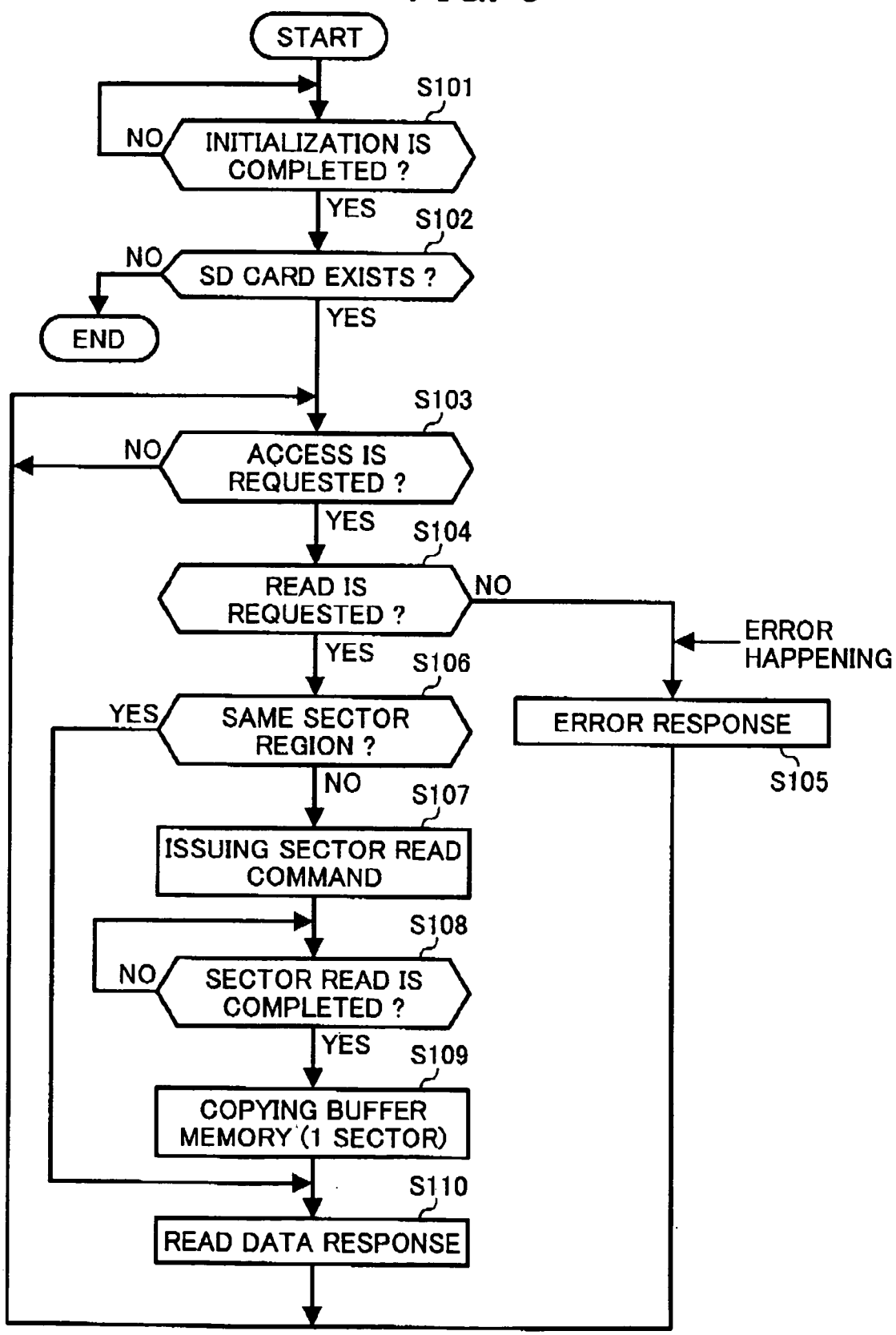
FIG. 5 illustrates an exemplary sequence of read access to the SD card executed by a control circuit.

Now, a sequence of read access from the control circuit 29 to the SD card is described with reference to FIG. 5. Specifically, an operation of the control circuit 29 executed when accessing to a SD card area of an ASIC is described.

First, the control circuit 29 determines if initialization of the SD card controller 26 is completed in step S101. If the initialization is completed, the control circuit 29 determines if the SD card is present in step S102. If the SD card is absent, the process is terminated.

If the SD card is present, the process goes to step S103, in which an access request is waited for. If the access request is made, the control circuit 29 determines if the access request indicates a reading request in step S104. If the reading request is not indicated and the other request, such as a write request, etc., is indicated, the control circuit 29 outputs an error response, and the process returns to step S103.

If the reading request is indicated, the control circuit 29 determines if it relates to the same selector region in step S107. If it relates to the same selector region, the process goes to step S110. If it does not relate to the same selector region, the control circuit 29 issues a sector read command to the SD control circuit 26 in step S107. Thus, reading starts. If it is determined that the sector read is completed in step S108, the control circuit 29 copies a buffer memory in step S109. Then, the control circuit 29 outputs a read data response in step S109, and the process goes to step S103 in which an access request is waited for.

Figure 6:
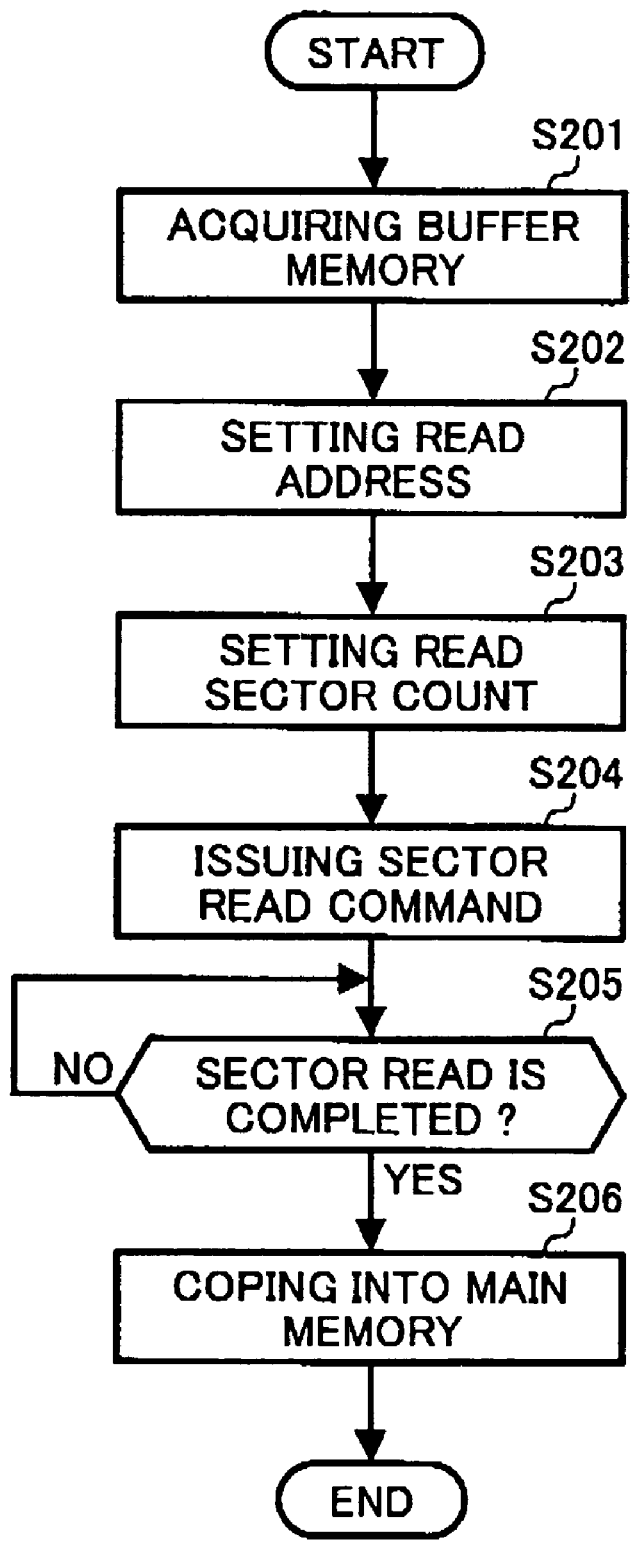
FIG. 6 illustrates an exemplary sequence of read access to the SD card executed by a software.

Now, a sequence of read access to a SD card by means of a software is now described with reference to FIG. 6 in contrast to the above-mentioned control circuit 29 of a hardware.

In step S201, a buffer memory is acquired to store information read from the SD card. In step S202, a read address is designated as a leading address from which reading starts. In step S203, a read selector count is designated to represent a number of sectors to read starting from the read address.

Then, a sector read command is issued in step S204, thereby reading starts. If the sector read is completed in step S205, copying to a main memory is started in step S206.

Figure 7:
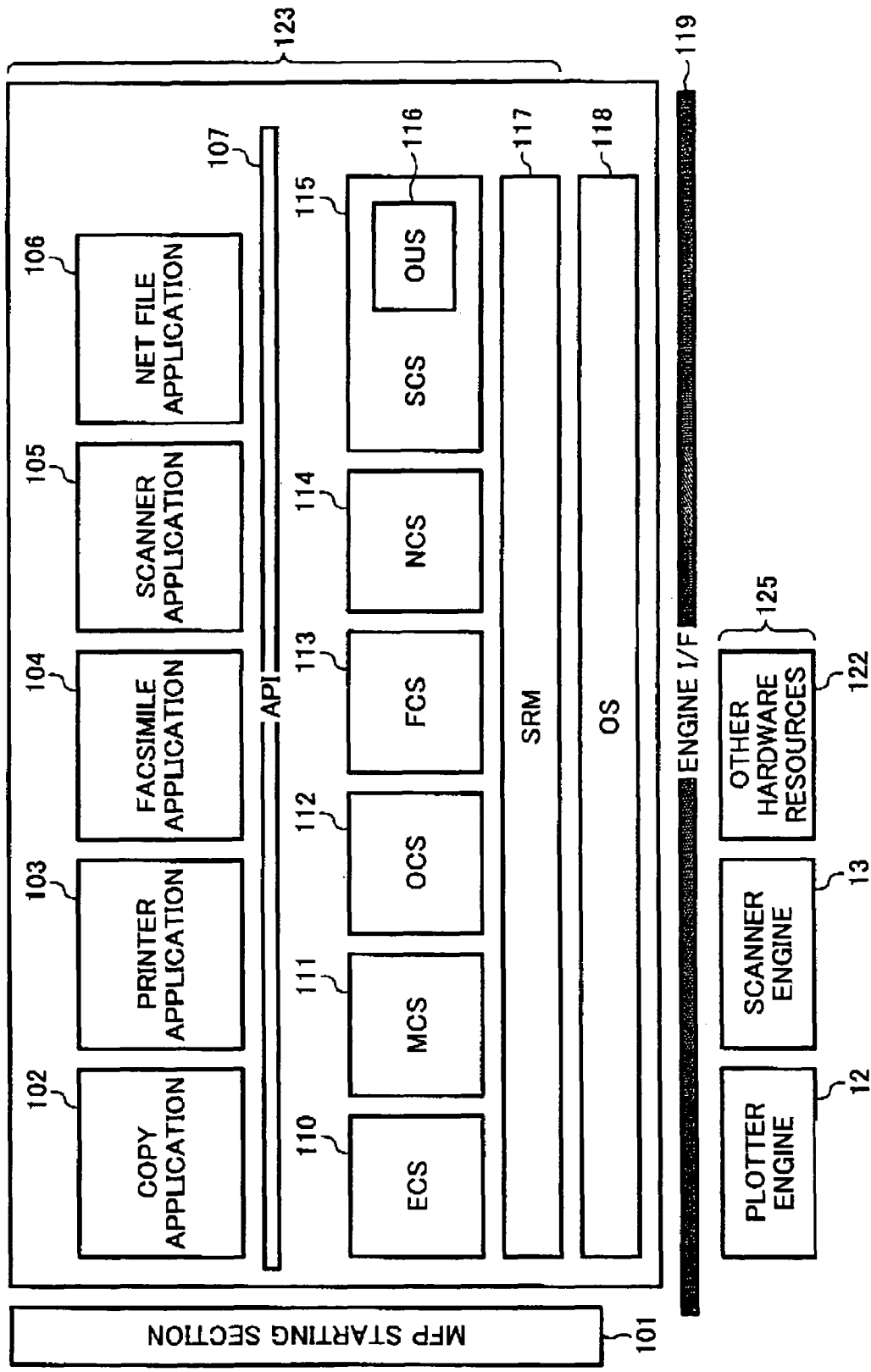
FIG. 7 illustrates an exemplary software of the MFP.

Now, a software of the MFP is described with reference to FIG. 7. As shown, a program group 123 of the MFP, a MFP starting section 101, and a hardware resource 125 are included.

The MFP1 starts the program group 123 using the MFP starting section 101 in response to power supplying. The hardware resource 125 includes a plotter engine 12, a scanner engine 13 and other hardware resources 122. The other hardware resources may include an ADF, for example.

The program group 123 is started on an operation system, such as a UNIX (TM), etc.

Various applications, such as a copier use application 102, a printer use application 103, a facsimile use application 104, a net file application 104, etc., are utilized.

Various services, such as an engine control service 110, a memory control service 111, an operation panel control service 112, a facsimile control service 113, a network control service 114, a system control service 115, etc., are executed by these applications through an API (Application Program Interface) 107.

The system control service 115 includes an on-demand updating service 116.

Among those, a process of the engine control service 110 controls an engine, such as a plotter engine 12, a scanner engine 13, etc. A process of the memory control service 111 executes memory control, such as obtaining and releasing a memory, usage of a HDD, etc. A process of the operation panel control service 112 controls an operation panel that serves as an information communications device between an operator and an apparatus. A process of the facsimile control service 113 provides an API that executes facsimile communications using a PSTN or an ISDN network. The process registers and quotes various facsimile data administrated in a memory for backup use, reads, receives, and prints the facsimile, or the like.

A process of the network control service 114 provides commonly available services to applications, which use a network I/O. Specifically, the process of the NCS 114 distributes data received from the network side to respective applications using respective protocol, and mediates data transmission from the respective applications to the network side. The process of the NCS 114 controls data communications with network instruments via the network using hypertext transfer protocol daemon by means of HTTP.

A process of the system control service 115 executes various processing, such as application administration, operation section controlling, system screen displaying, LED displaying, hardware resource administration, interruption application control, etc. A process of the on-demand update service 116 receives update program for updating existing program from the network.

A process of the SRM 117 executes system control and hardware resource administration in cooperation with that of the system control service 115. For example, a process of the SRM 117 executes mediation in accordance with acquirement requests for hardware, such as a plotter engine 12, a scanner engine 13, etc., from an upper lank layer, while controlling operations.

Specifically, the process of the SRM 40 determines if a hardware resource that is requested to acquire is available, and reports availability thereof to the upper lank layer if the determination is positive. The process also schedules usage of the hardware resource of the acquirement requests from the upper lank layer, and directly corresponds to requests, such as paper transportation and image formation executed by a printer engine, memory reservation, file generation, etc.

Figure 8:
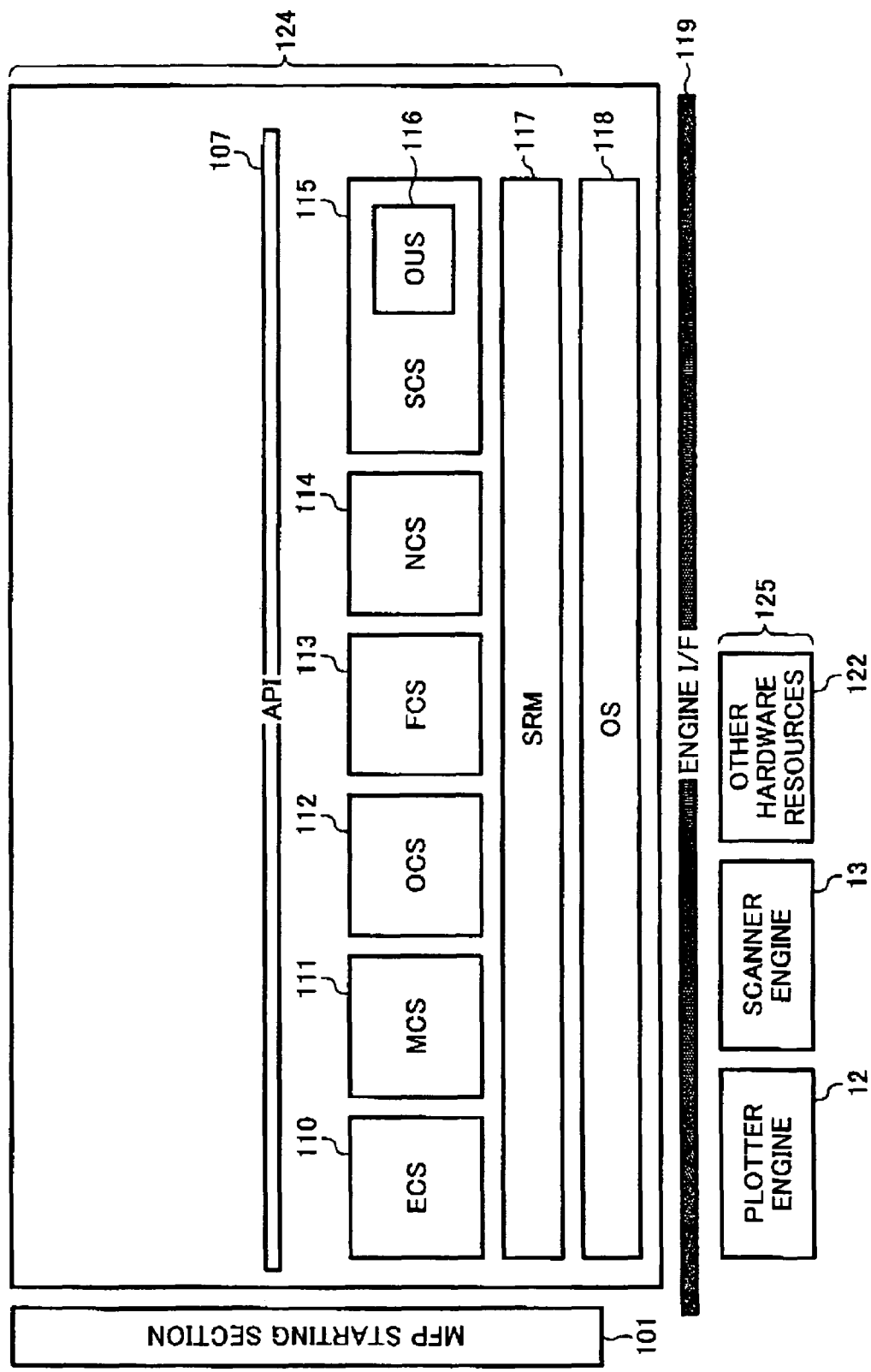
FIG. 8 illustrates an exemplary configuration when a rescue system starts.

Now, a software of a rescue system is described with reference to FIG. 8. As represented by a program group 124 in FIG. 8, an application does not yet start in the software configuration. Remaining portions are substantially the same as those in FIG. 7.

Now, a start sequence of the MFP is described. FIG. 9 illustrates a conventional sequence in a mapping mode.

In step S301, a ROM monitor loaded in the SD card operates the MFP. The ROM monitor serves as a program that loads and executes an operation system. A phrase "ROM monitor (a SD card)" used in step S301 represents that the ROM monitor is loaded in the SD card. The same applies to a phrase "ROM monitor (a RAM)".

In step S302, a program start section loaded in the SD card operates the MFP in a similar manner to the above.

Figure 10:
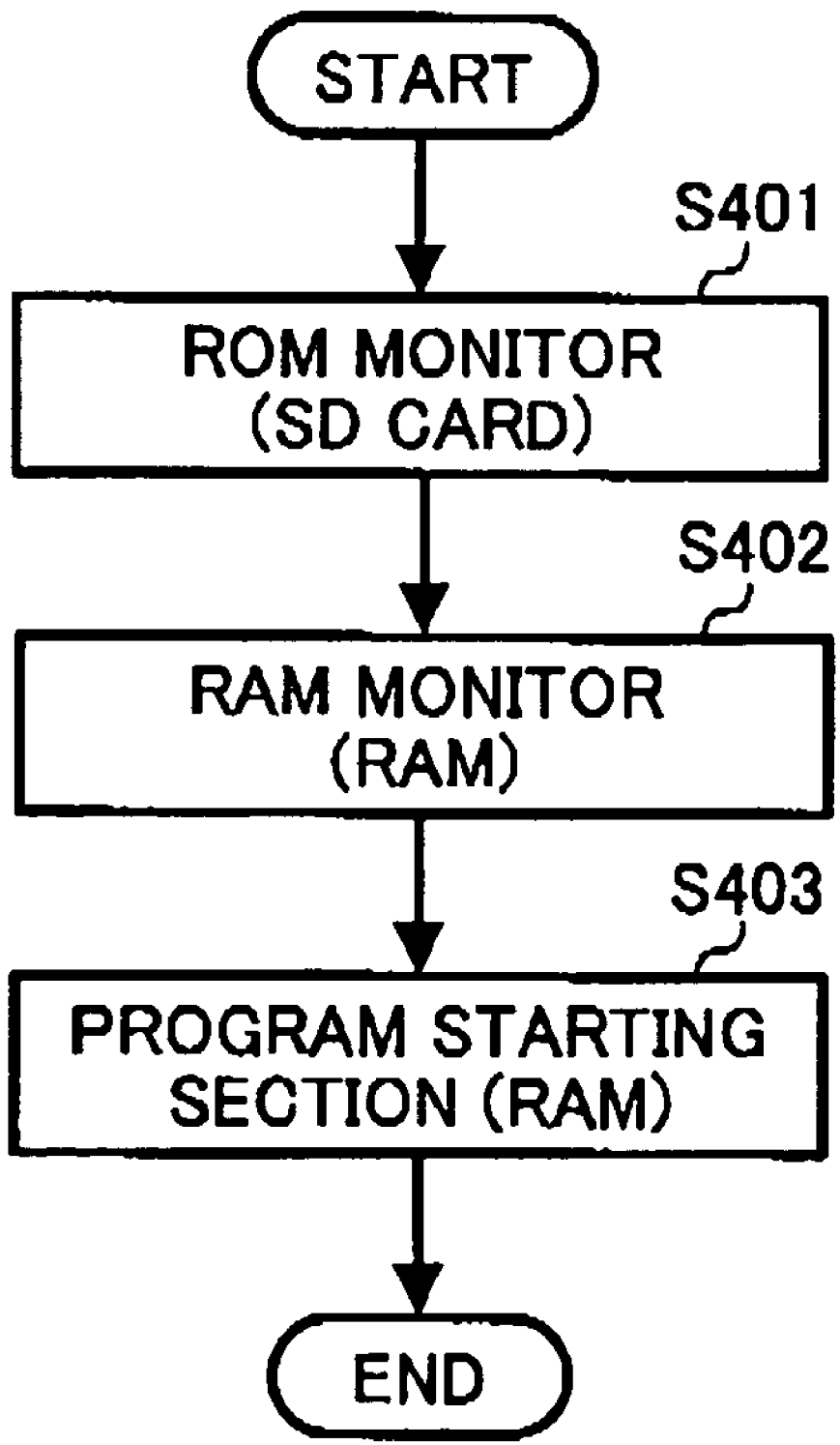
FIG. 10 illustrates an exemplary start sequence of loading to a RAM.

Thus, a program loaded in the conventional SD card runs in a mapping mode. Since a processing speed is slow in the mapping mode, a program is loaded in a RAM and runs in accordance with a start sequence as shown in FIG. 10. Specifically, in step S401, when the MFP is operated by a ROM monitor loaded in the SD card in a similar manner as mentioned above, the MPF monitor is copied into the RAM.

The MFP is operated by the RAM monitor copied in step S402, and is operated by the program start section loaded in the RAM in step S403. Thus, the start sequence can be executed at high speed.

Figure 11:
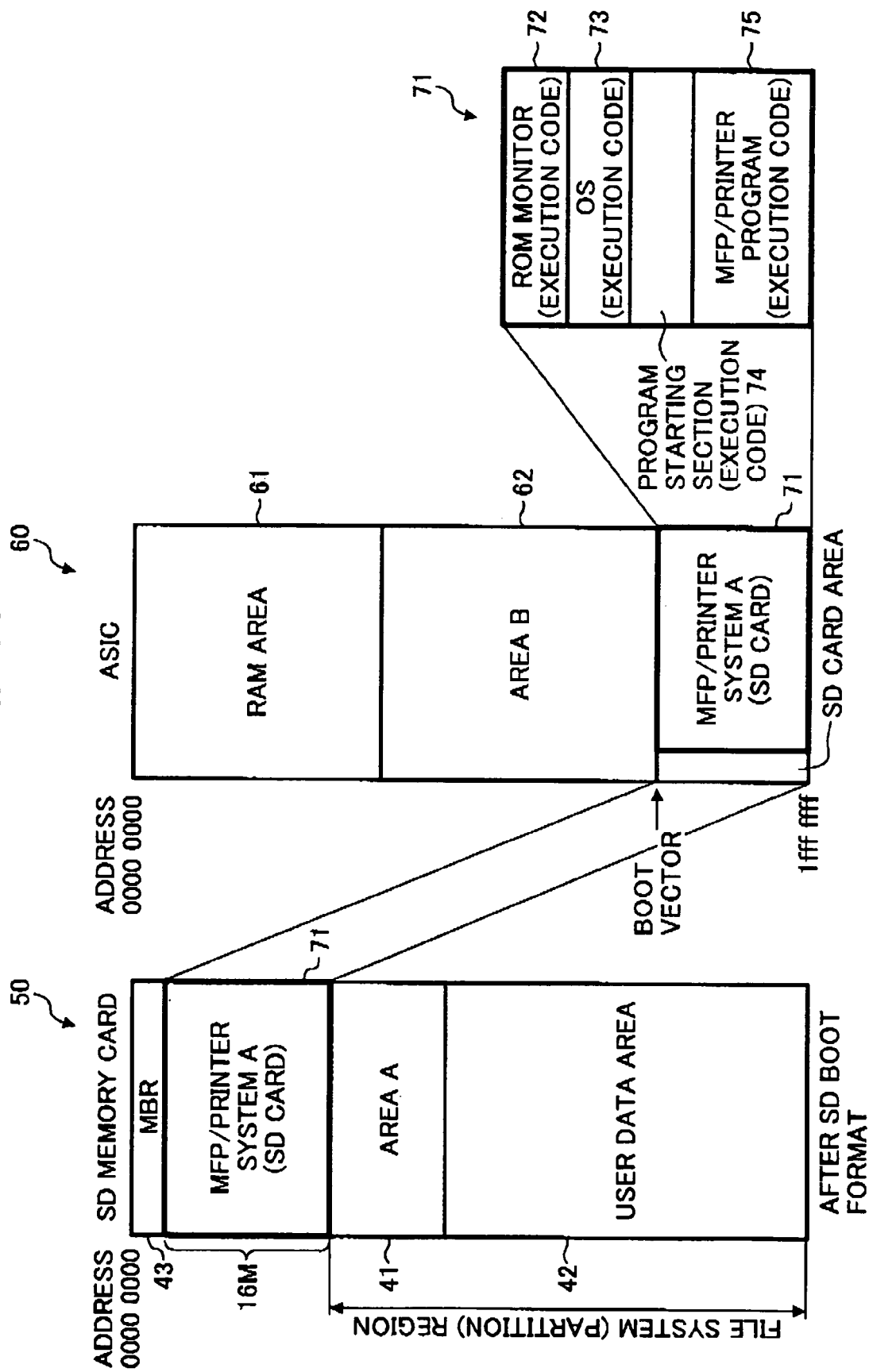
FIG. 11 illustrates an exemplary memory map in which a program is arranged outside a file system.

Hereinbelow, arrangement of program in the SD card is described with reference to FIG. 11. Since FIG. 11 is similar to FIG. 4, repetitious descriptions are herein below avoided.

As shown, a MFP/printer system A71 serving as a program is arranged between a MBR 43 and an area A41 in a memory map 50, and is mapped to a SD card area of the ASIC as indicated in a memory map 60 of the ASIC.

Thus, since a program operates in the SD card area of the ASIC, a file system of the SD card is impossible to be accessed by means of the above-mentioned software. Thus, the SD card is unavailable as a file system.

As shown, a MFP/printer system A71 is formed from a ROM monitor 72, an operation system 73, a program start section 74, and a MFP/printer program 75 having execution codes. These program start section 74 and MFP/printer program 75 can be formed from a file system different from that of the SD card.

Figure 12:
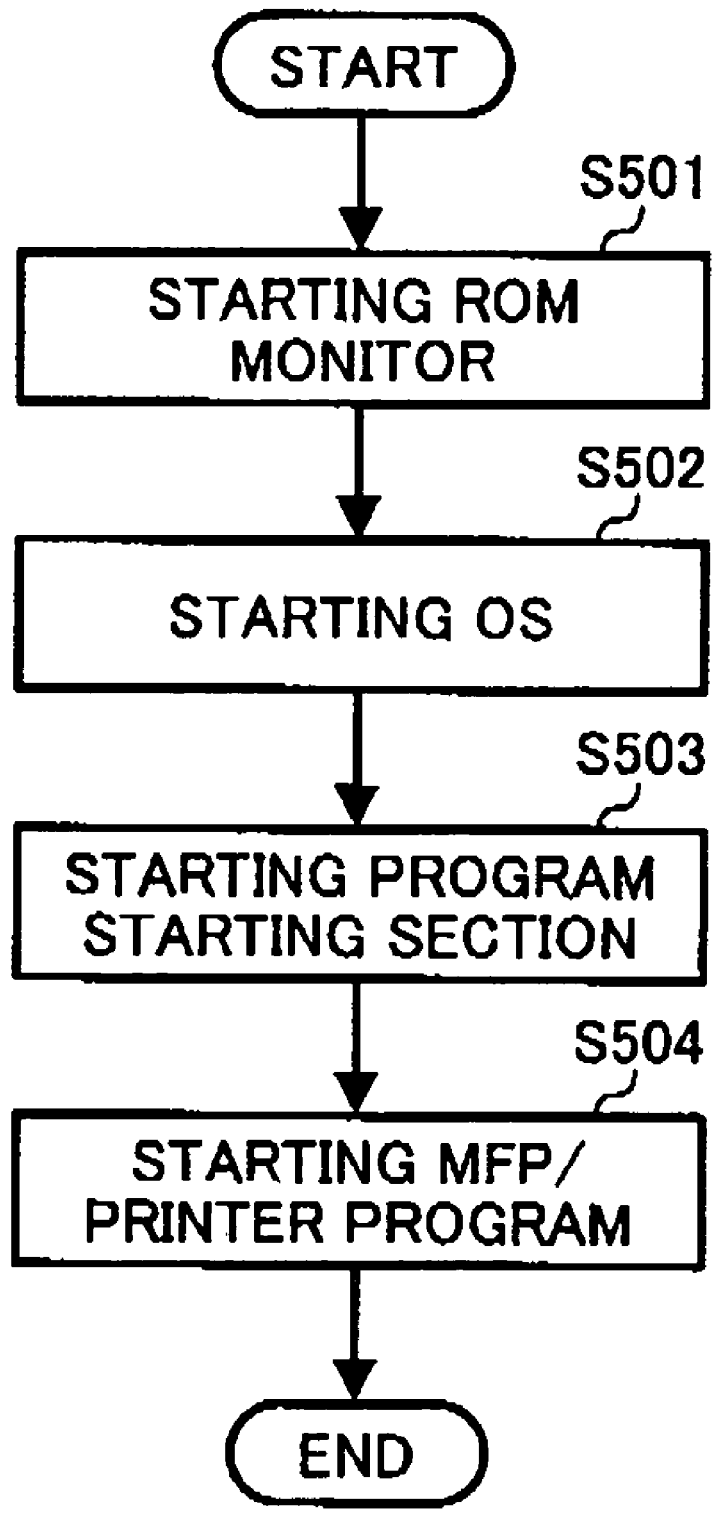
FIG. 12 illustrates an exemplary start sequence.

Now, a start sequence is described with reference to FIG. 12 when a SD card has program arrangement as illustrated in FIG. 11. First, a ROM monitor starts in step S501. An operation system starts in step S502. A program start section starts in step S503. A MFP/printer program starts in step S504.

Now, a memory map, in which the MFP/printer system is arranged outside a file system, is described with reference to FIG. 13. As shown, a MFP/printer system B81 as a program is arranged between a MBR 43 and an area A41 in the memory map 50. The MFP/printer system B81 is mapped to a SD card area of an ASIC as shown in the memory map 60 of the ASIC. Further, the MFP/printer system B82 is loaded in a RAM area 61.

The MFP/printer system B81 is formed from a ROM monitor 72, a RAM monitor 83, an operation system 84, a program start section 85, and a MFP/printer program 86. Among those, the ROM monitor includes an execution code, and the others include RAM execution codes.

A difference between a RAM execution code and an execution code is as follows: The latter code can be executed as is, while the former code is designed to be executed at a prescribed RAM address, and thus needs rearrangement of the code to the prescribed RAM address. Thus, respective codes of the RAM monitor, the operation system 84, the program start section 85, and the MFP/printer program 86 can be compressed, and respective RAM execution codes can be decoded when loaded in the RAM area 61. Further, the program start section 85 and the MFP/printer program 86 can be a file image. The program start section 89 and the MFP/printer program 90 can be file systems. When a file system is implemented on the operation system 88, a file system region of the SD card can be accessed.

Figure 13:
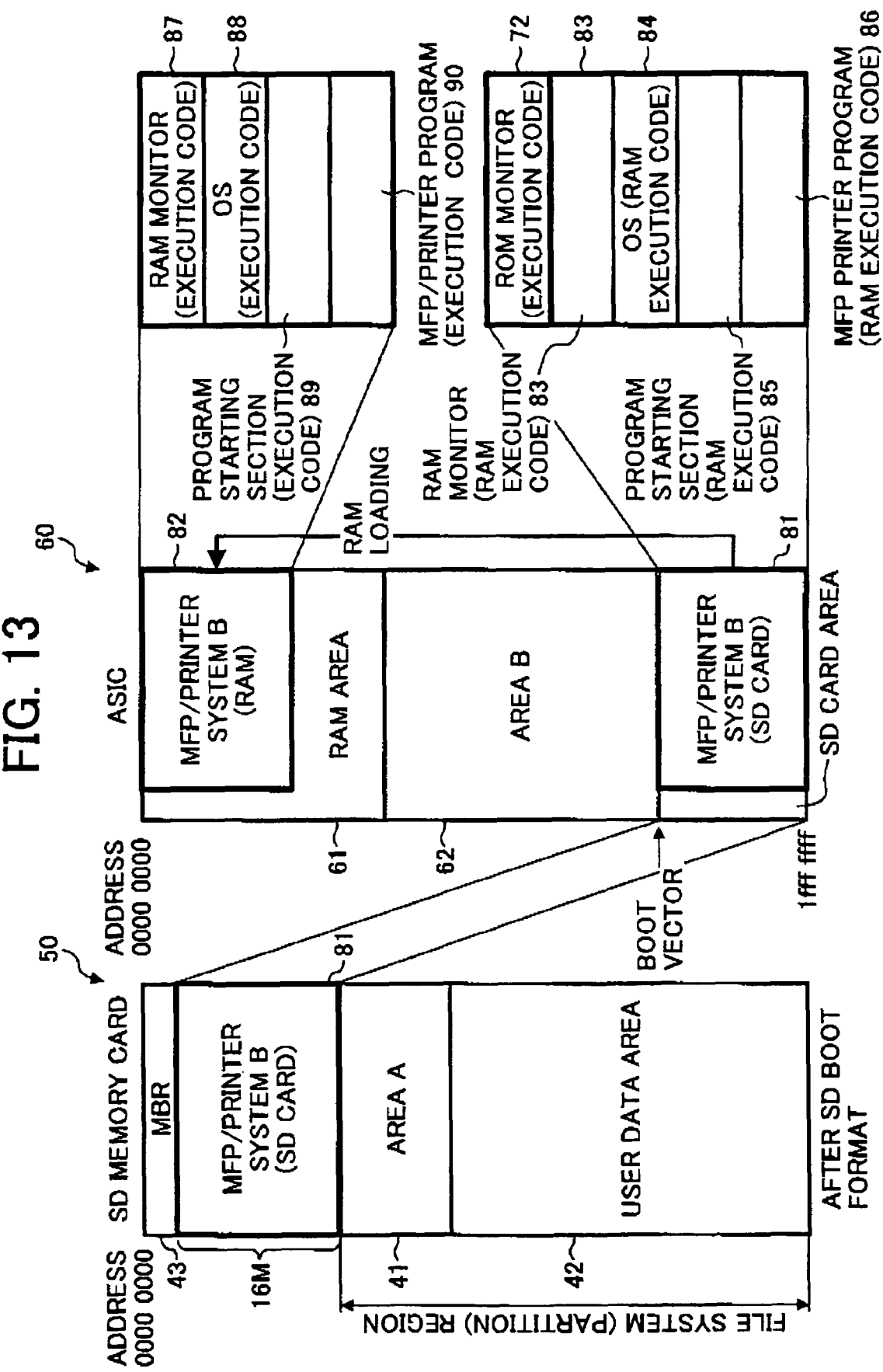
FIG. 13 illustrates an exemplary memory map in which a MFP/printer system is arranged outside the file system.
Figure 14:
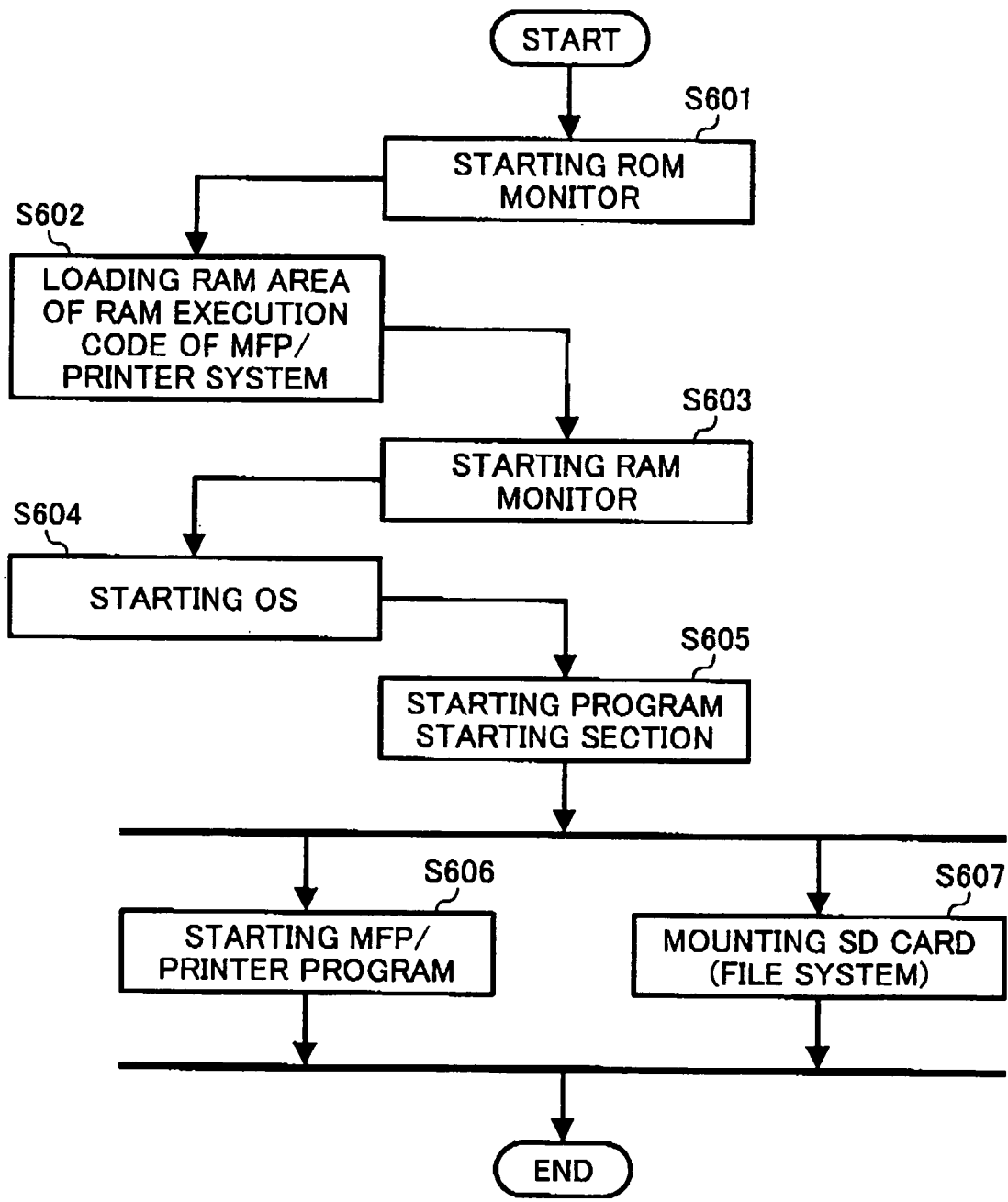
FIG. 14 illustrates an exemplary start sequence.

Now, another start sequence is described with reference to FIG. 14 when a SD card has program arrangement as illustrated in FIG. 13. First, a ROM monitor starts in step S601. A RAM execution code of a MFP/printer system is loaded in a RAM area in step S602. A RAM monitor loaded in a RAM area starts in step S603. An operation system, a program starting section, and a MFP/printer program start in steps S604, S605, and S606, respectively, while similarly being loaded in a RAM area. The SD card (the file system) is mounted in step S607.

Now, a first memory map, in which a MFP/printer program and a rescue system are arranged outside a file system, is described with reference to FIG. 15. Thus, the MFP/printer program and the rescue system are generally difficult to delete because of existing the outside the file system (herein below the same whenever program exists the outside). The rescue system serves as a program capable of executing recovery when rewriting of an update program results in failure.

As shown, a boot selector 91, a rescue system A92, and a MFP/printer system C93 are arranged between a MBR 43 and an area A41 in a memory map 50. The boot selector 91, the rescue system A92, and the MFP/printer system C93 are mapped to a SD card area of the ASIC as shown in the memory map 60 of the ASIC.

The boot selector 91 serves as a ROM monitor 72 including a program that selectively uses a rescue system. The rescue system A92 is formed from a rescue operation system 301, a rescue program starting section 202, and a rescue program 203 each having an execution code.

The MFP/printer system C93 is formed from an operation system 88, a program start section 89, a MFP/printer program 90, each having an execution code.

The rescue program start section 202, the rescue program 203, the program start section 89, and the MFP/printer program 90 can be administrated by a different file system from that of the SD card.

Figure 15:
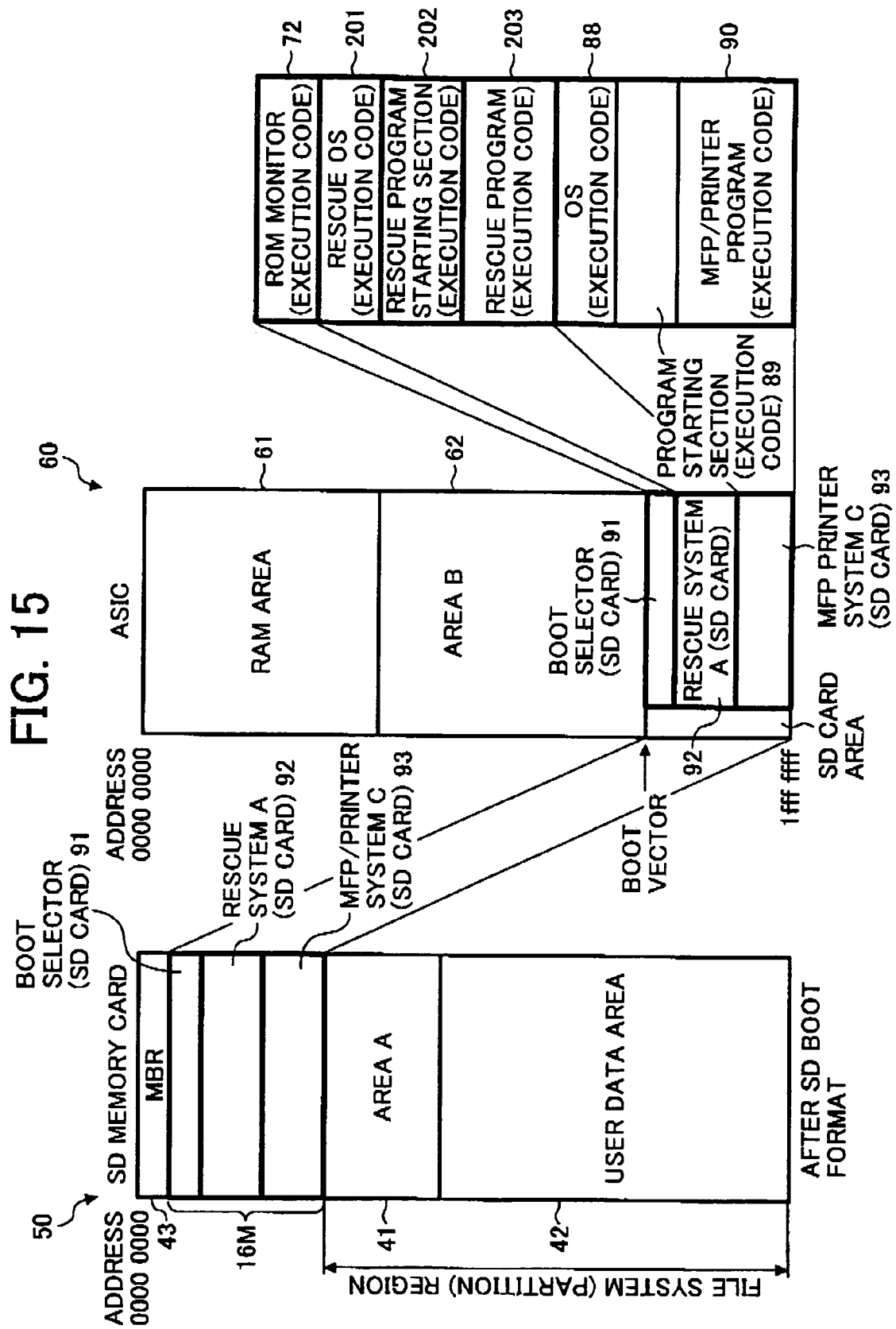
FIG. 15 illustrates an exemplary memory map in which a MFP/printer system and a rescue system are arranged outside the file system.
Figure 16:
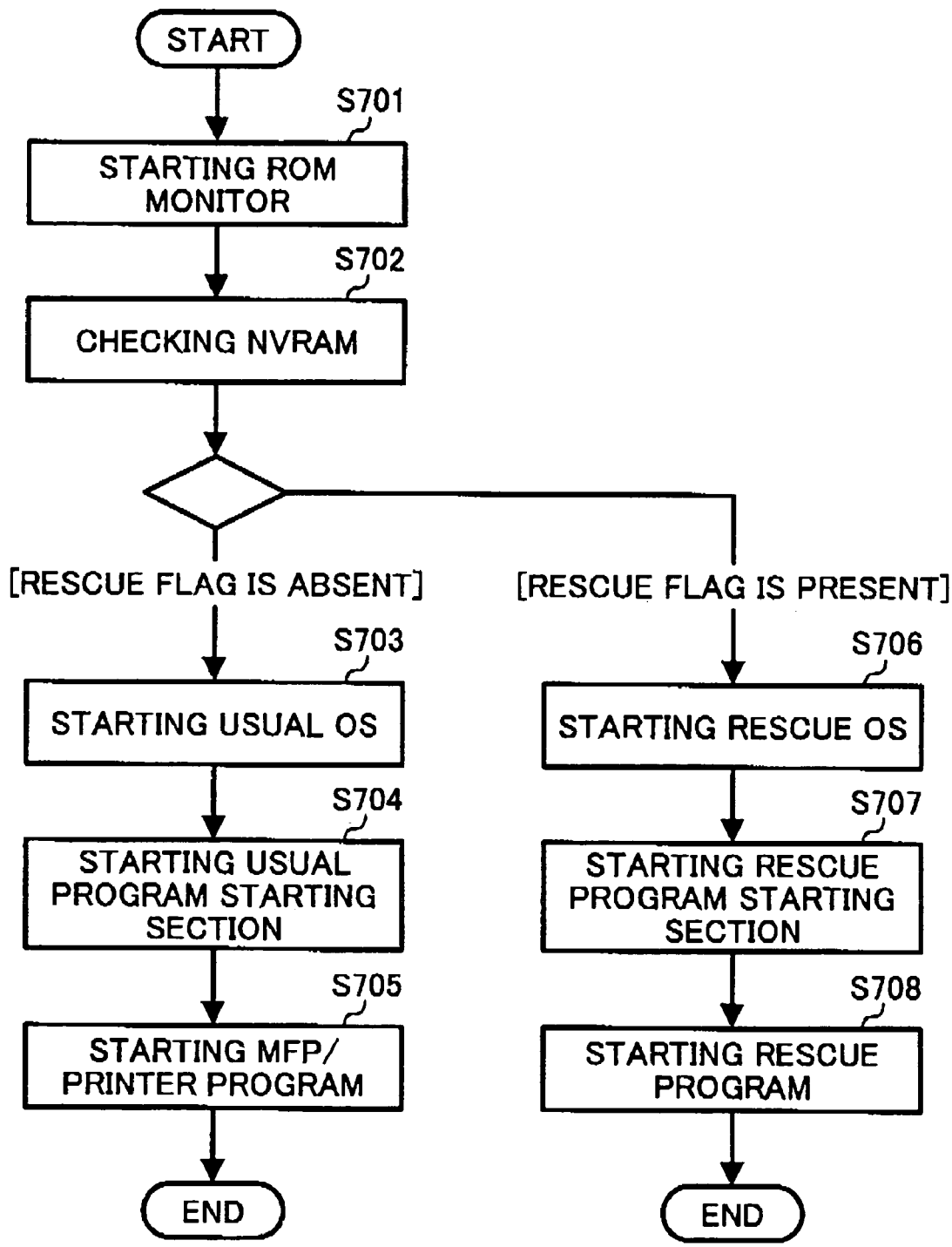
FIG. 16 illustrates an exemplary start sequence.

Now, another start sequence is now described with reference to FIG. 16 when a SD card having program arrangement as shown in FIG. 15 is utilized. First, a ROM monitor starts in step S701. A NVRAM is checked, i.e., a rescue flag is checked in step S702. The rescue flag represents if rewriting of an update program results in failure. The rescue flag is present when the rewriting is not completed and ends by some reason, for example.

If the checking result in step S702 is negative (i.e., a rescue flag is absent), a normal operation system (i.e., not rescue system) starts in step S703. Subsequently, a normal program start section starts in step S704. A MFP/printer program starts in step S705.

If the rescue flag is present, a rescue operation system starts in step S706. Subsequently, a rescue program start section starts in step S707. A rescue program starts in the next step S708.

Figure 17:
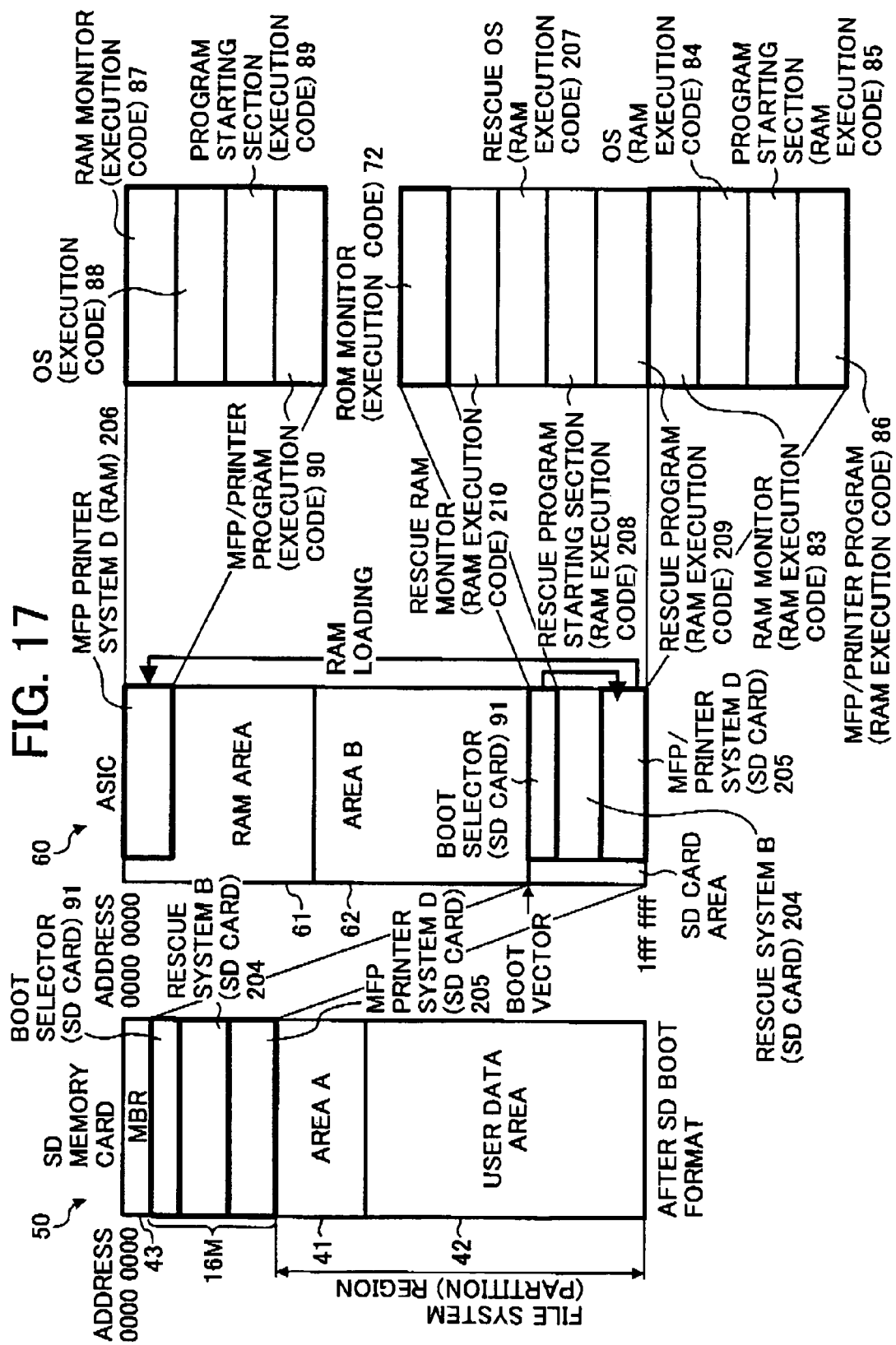
FIG. 17 illustrates another exemplary memory map in which a MFP/printer system and a rescue system are arranged outside the file system.

Now, a second memory map, in which a MFP/printer program and a rescue system are arranged outside a file system, is described with reference to FIG. 17. As shown, FIG. 17 illustrates conditions in which a boot selector loaded in a SD card area of the ASIC drives a rescue system, and the rescue system causes a MFP/printer system to be loaded in a RAM area.

As shown, a boot selector 91, a rescue system B204, and a MFP/printer system D205 are arranged between a MBR 43 and an area A41 in a memory map 50. The boot selector 91, the rescue system B204, and the MFP/printer system D205 are mapped to a SD card area of the ASIC as shown in the memory map 60.

The rescue system B204 is formed from a rescue RAM monitor 210, a rescue operation system 207, a rescue program start section 208, and a rescue program 209. These programs include RAM execution codes. Thus, files of those can be compressed.

The MFP/printer system D205 is formed from a RAM monitor 83, an operation system 84, a program start section 85, and a MFP/printer program 86. These programs also include RAM execution codes. Thus, files of those can also be compressed.

The rescue OS 207, the rescue program start section 208, the rescue program 209, the operation system 84, the program start section 85, and the MFP/printer program 86 can be an image of a combined file system. If a file system is implemented on the operation system 88, a file system region of the SD card can be accessed.

Now, execution of a rescue system in a third memory map, in which a MFP/printer program and a rescue system are arranged outside a file system, is described with reference to FIG. 18. As shown, in contrast to an example of FIG. 17, a boot selector loaded in a SD card area of an ASIC causes a rescue system to be loaded in a RAM area. Accordingly, a difference from the example of FIG. 17 is that the rescue system B220 is loaded in the RAM area 61.

The loaded rescue system B220 is formed from a rescue RAM monitor 221, a rescue operation system 222, a rescue program start section 223, and a rescue program 224.

Figure 18:
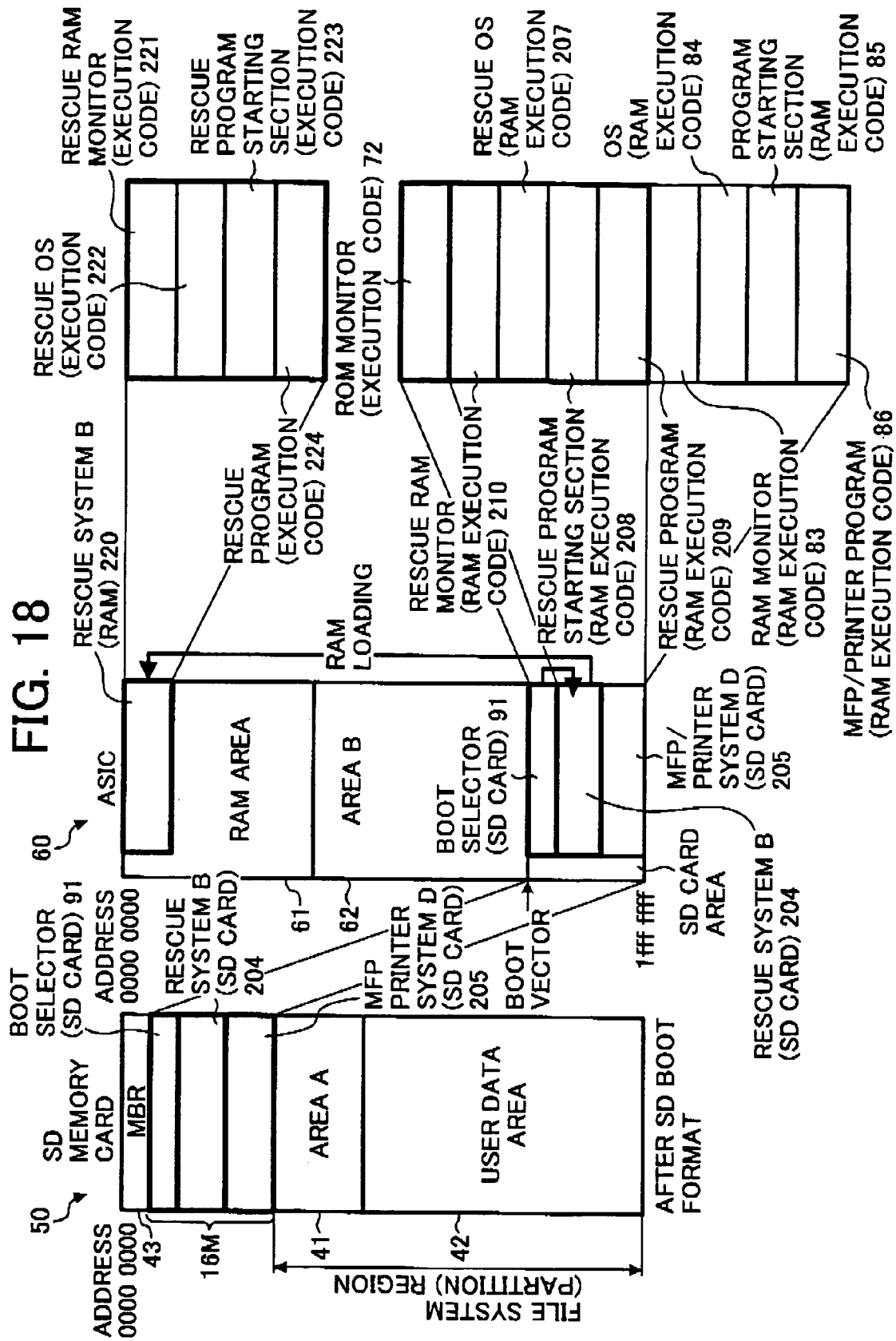
FIG. 18 illustrates still another exemplary memory map in which a MFP/printer system and a rescue system are arranged outside the file system.

Similarly, a file system of the SD card can be accessed if a file system is implemented on the operation system 88 in the example of FIG. 18.

Now, another start sequence is described with reference to FIG. 19 in which a SD card having program arrangement as shown in FIGS. 17 and 18 is employed. First, a ROM monitor starts in step S801. A NVRAM is checked in step S802.

If a rescue flag is absent as a result of the check in step S802, a MFP/printer system is loaded in a RAM area in step S803. A normal RAM monitor starts in the next step S804. A normal operation system subsequently starts in step S805. A normal program start section starts in the next step S804.

A MFP/printer program starts in step S807, and a SD card is mounted in step S808.

If the determination in step S802 is positive (i.e., a rescue flag is present), a rescue system is loaded in the RAM area in step S809. A rescue RAM monitor starts in the next step S810. A rescue operation system starts in the next step S811. A rescue program start section subsequently starts in step S812. Thus, a rescue program starts in step S813, and the SD card is mounted in step S814.

Now, execution of a MFP/printer system in a first memory map, in which the MFP/printer system is arranged within a file system and a rescue system is arranged outside the file system, is described with reference to FIG. 20.

As shown, a boot selector 91 and a rescue system A92 are arranged between a MBR 43 and an area A41 in a memory map 50 of a SD card. These boot selector 91 and rescue system A92 are mapped to the SD card area of the ASIC as shown in the memory map 60.

A file 207 of the MFP/printer system D is loaded in a file system as shown in the memory map 50.

The file 207 of the MFP/printer system D can be an image such that a RAM monitor, an operation system, a program start section, and a MFP/printer program collectively form a combined file system.

The file 207 is loaded in the RAM area 61 as a MFP/printer system D206 as shown in a memory map 60. A boot selector 91 loaded in the SD card area of the ASIC executes such loading.

Now, still another example is described with reference to FIG. 21. Similar to the example of FIG. 20, a memory map is illustrated, in which a MFP/printer program is arranged in the file system, and a rescue system is arranged outside the file system. A rescue system is executed in this situation as follows:

As shown, a boot selector 91 and a rescue system A92 are arranged between an area A41 and a MBR 43 in a memory map 50. A MFP/printer system 208 is loaded in the file system.

The boot selector 91 and the rescue system A92 are mapped to a SD card area of the ASIC as shown in the memory map 60. The boot selector 91 thus mapped starts the rescue system A92.

Figure 21:
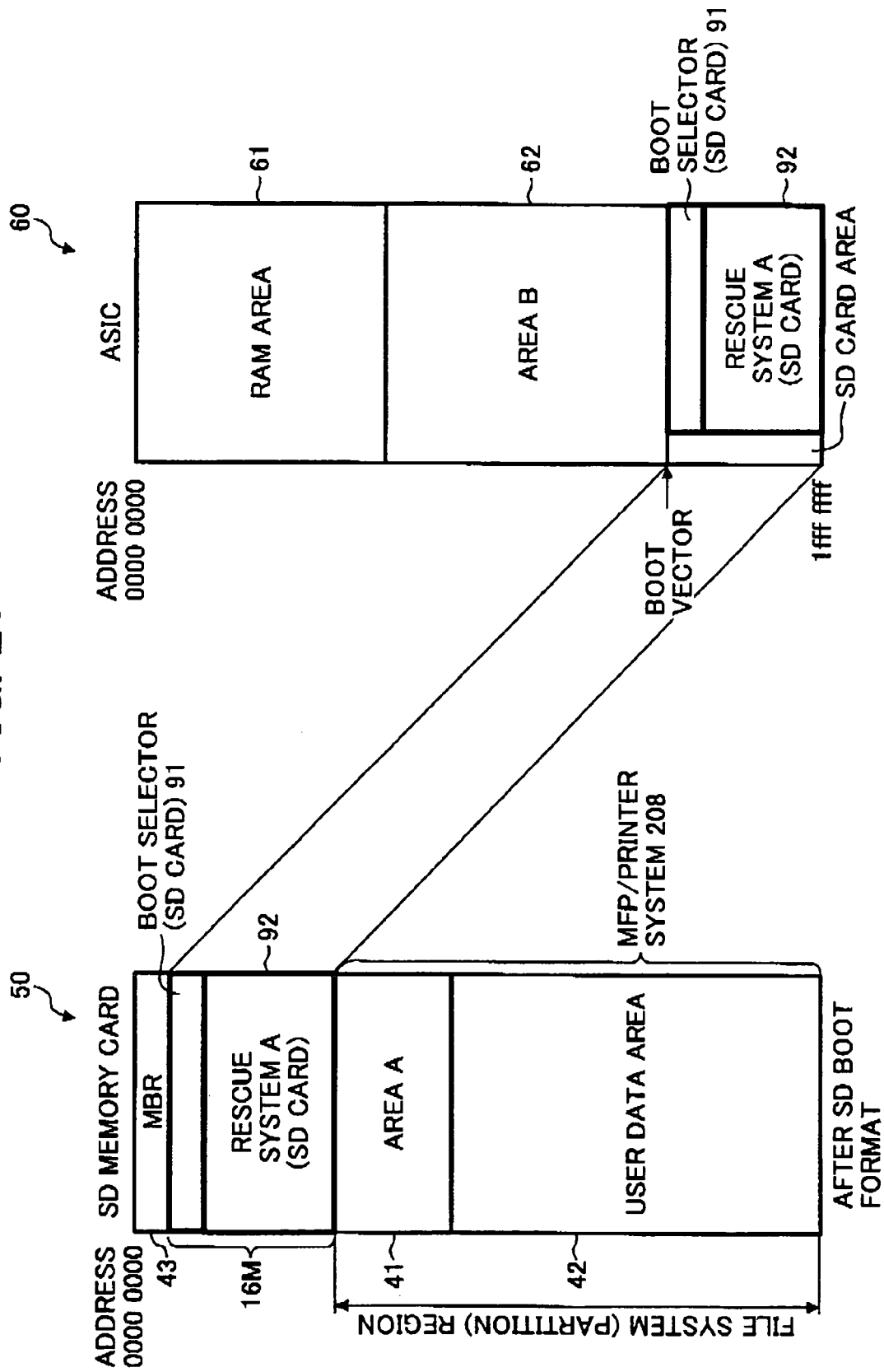
FIG. 21 illustrates another exemplary memory map in which a MFP/printer system and a rescue system are arranged inside and outside the file system, respectively.
Figure 22B:
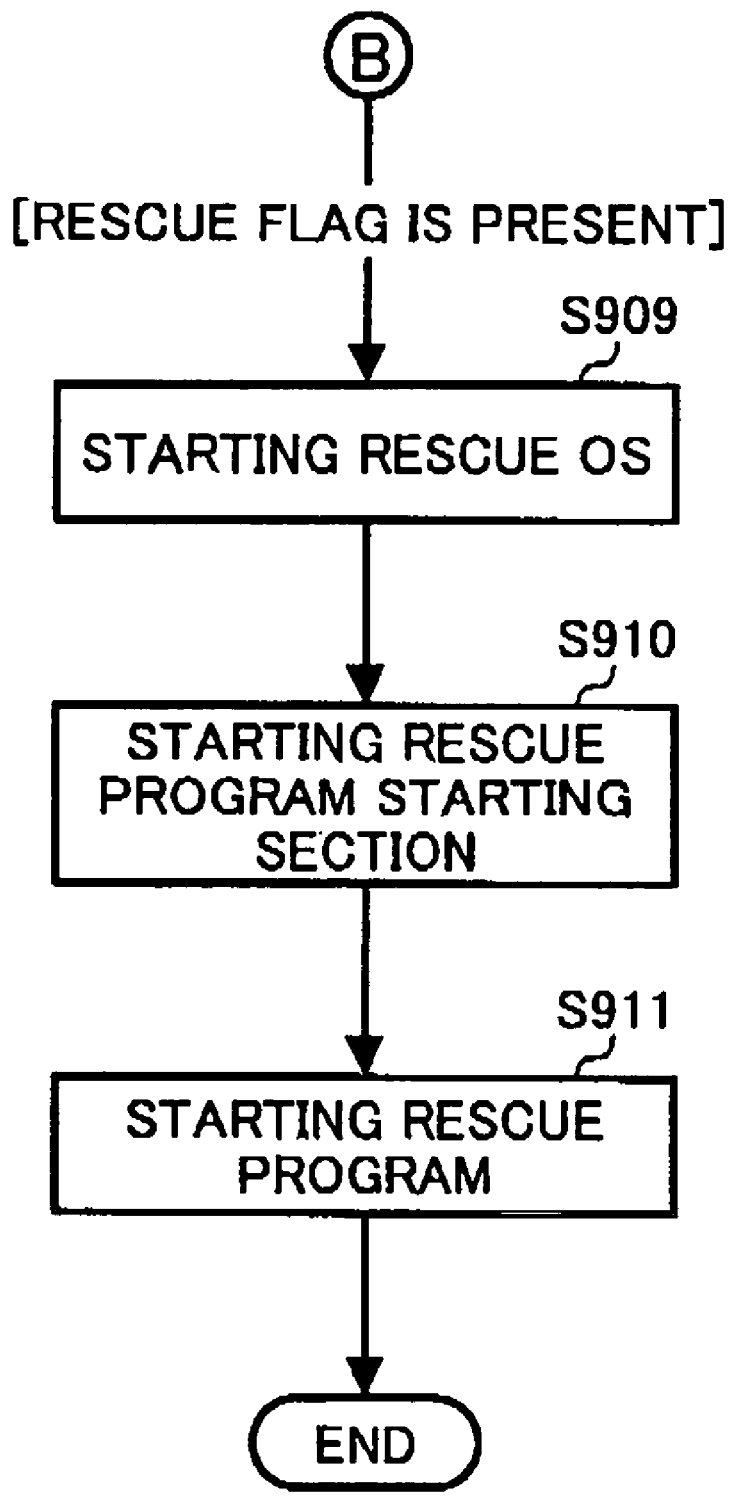

Now, a start sequence is described with reference to FIG. 22 when the SD card has program arrangement as illustrated in FIGS. 20 and 21. First, a ROM monitor starts in step S901. A NVRAM is checked in the next step S902.

If the checking results in negative in step S902, a file of a MFP/printer system is loaded in a RAM area in step S903. A normal RAM monitor starts in the next step S904. A normal operation system subsequently starts in step S905. A normal program start section starts in the next step S906.

A MFP/printer program starts in step S907. A SD card is mounted in step S908.

In contrast, if the checking result is positive (i.e., a rescue flag is present) in step S902, a rescue operation system starts in step S909. A rescue program start section starts in the next step S910. A rescue program starts in the next step S911.

Referring now to FIG. 23, execution of a MFP/printer system in a memory map, in which a MFP/printer system and a rescue system are arranged inside and outside a file system, respectively, is described. As shown, a boot selector loaded in a SD card area of an ASIC drives a rescue system, and the rescue system causes a RAM monitor and an operation system to be loaded in a RAM area.

As shown, a boot selector 91 and a rescue system B204 are arranged between a MBR 43 and an area A41 in a memory map 50. The boot selector 91, the rescue system B204, and the MFP/printer system D205 are mapped to a SD card area of the ASIC as shown in the memory map 60.

A MFP/printer system file group 209 including a MFP/printer program group 210 is loaded in the file system.

The mapped boot selector 91 causes the RAM monitor and the operation system of the MFP/printer system group 209 to be loaded in the RAM area 61 of the ASIC as a RAM monitor 87 and an operation system 88, and executes those.

Figure 24A:
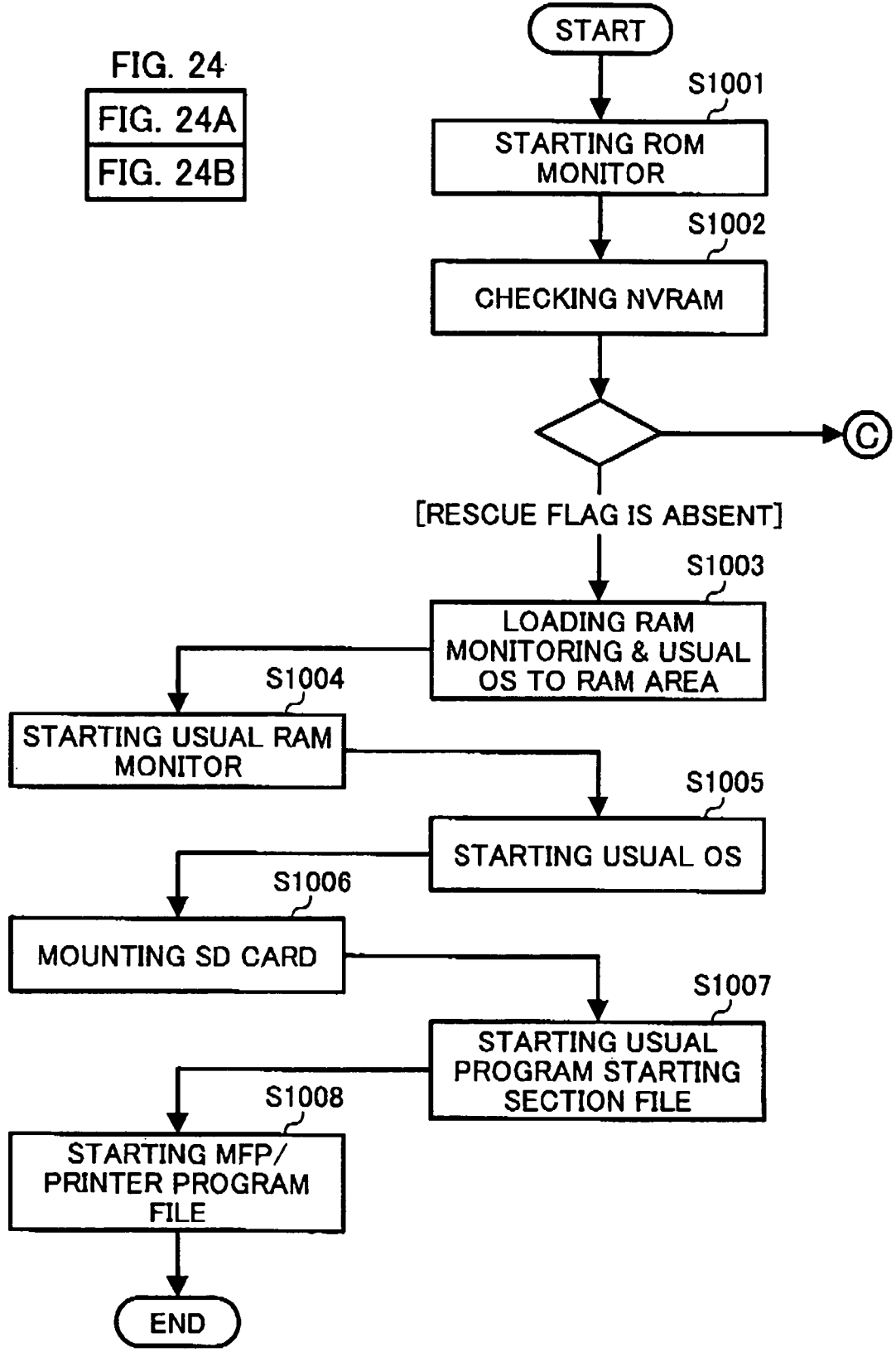
FIGS. 24A and 24B collectively illustrates an exemplary start sequence.
Figure 24B:
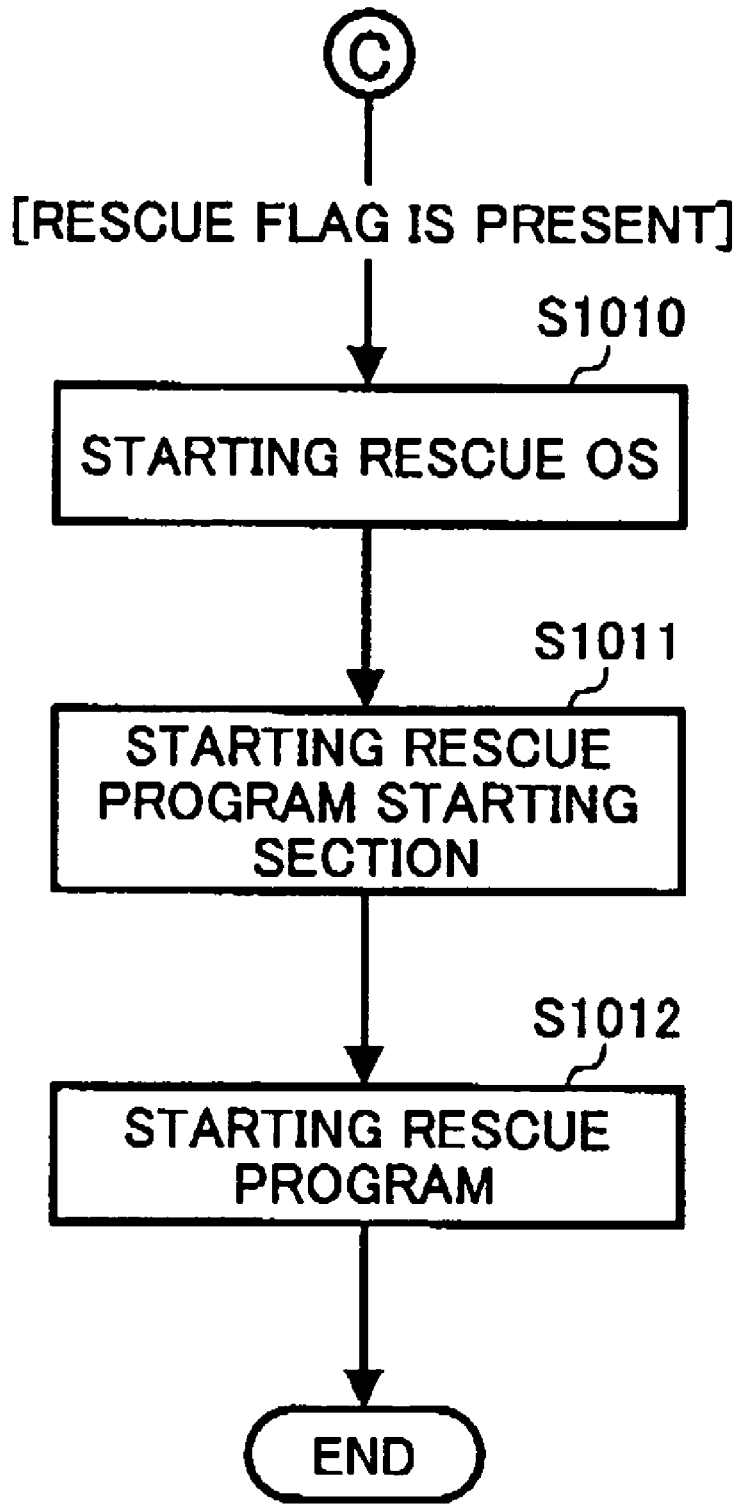

Now, still another start sequence is described with reference to FIG. 24 in which a SD card has program arrangement as illustrated in FIG. 23. A ROM monitor starts in step S1001. A NVRAM is checked in the next step S1002.

If the checking result in step S1002 is negative, a RAM monitor and a normal operation system expand in the RAM area in step S1003. A normal RAM monitor starts in the next step S1004. A normal operation system subsequently starts in step S1005. The SD card is mounted in the next step S1006.

A file of the normal program start section starts in step S1007. A MFP/printer program starts in step S1008.

If the checking result in step S1002 is positive, a rescue operation system starts in step S1010. A rescue program start section starts in the next step S1011. A rescue program starts in the next step S1012.

Now, execution of a rescue system in a memory map, in which a MFP/printer system is arranged within a file system and a rescue system is arranged outside the file system, is described with reference to FIG. 25. As shown, a boot selector loaded in a SD card area of an ASIC causes a rescue system to be loaded in a RAM area.

As shown, a boot selector 91 and a rescue system B204 are arranged between a MBR 43 and an area A41 in the memory map 50 of the SD card. These boot selector 91 and rescue system B204 are mapped to the SD card area of the ASIC as shown in the memory map 60 of the ASIC.

A MFP/printer system 208 is loaded in the file system shown in the memory map 50.

The mapped boot selector 91 causes the rescue system B204 to be loaded in the RAM area 61 of the ASIC, and executes those.

Figure 19B:
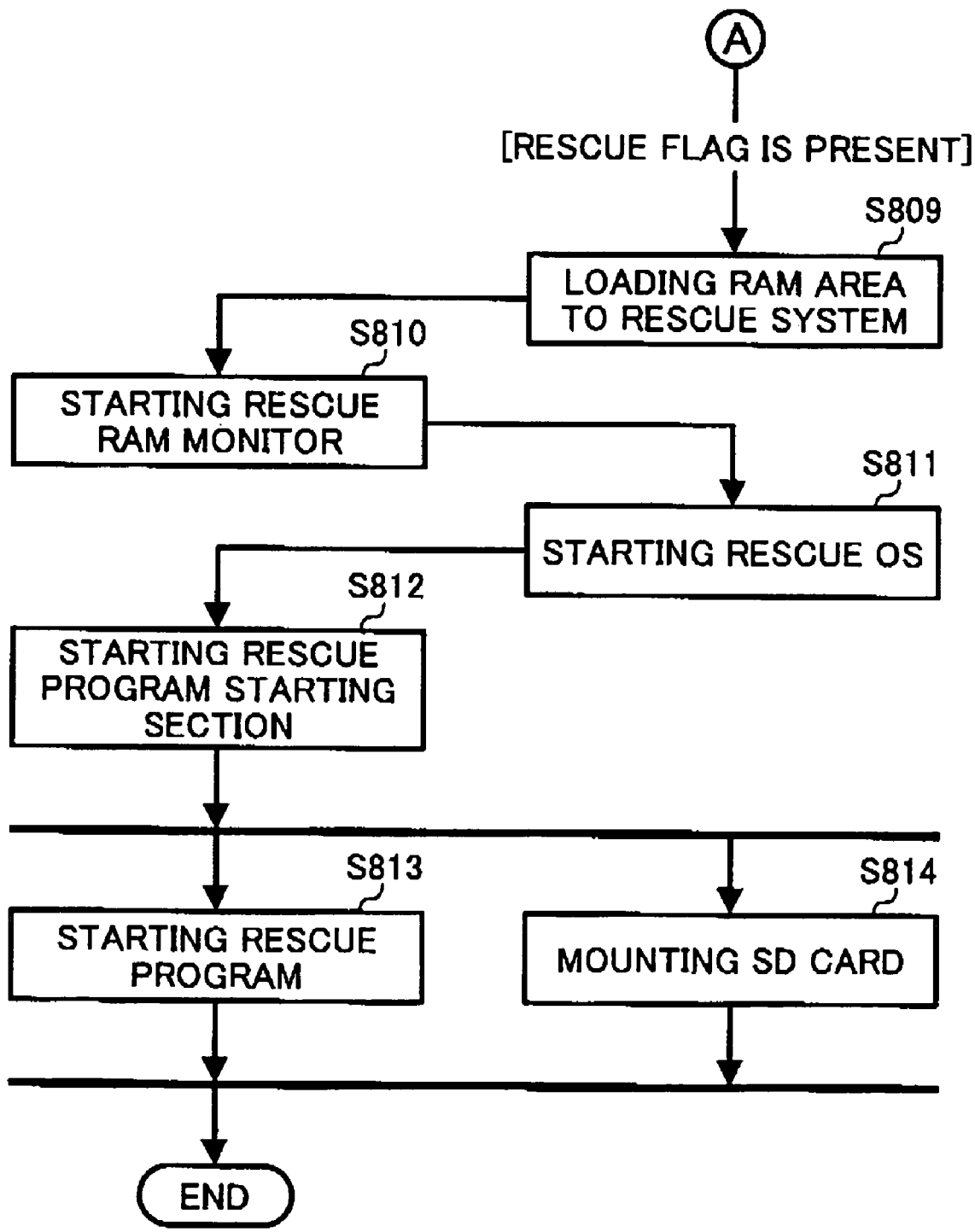

A start sequence executed when a SD card has program arrangement as illustrated in FIG. 25 is similar to that as illustrated in FIG. 19.

In the above-mentioned several embodiments, the MFP/printer program corresponds the image formation program. The program start section corresponds to the start program. The rescue program start section corresponds the start rescue program. The ROM monitor, the RAM monitor, and the boot selector collectively correspond to the boot loader program. The SD card area corresponds to a first memory device. The RAM area and the memory collectively correspond to the second memory device. The file system-mounting device corresponds to the CPU. The processing program corresponds to the MFP/printer system. The rescue system corresponds to the recovery program.

The ROM monitor mapped to the SD card area corresponds to a first boot loader program. The RAM monitor loaded in the RAM area corresponds to a second boot loader program.

Step S501 corresponds to the boot loader start step. Step S502 corresponds to the operation system start step. Step S504 corresponds to the image formation program start step. Step S702 corresponds to the rescue flag check step. Step S803 corresponds to the processing program expansion step. Step S808 corresponds to the file system mount step.

Numerous additional modifications and variations of the present invention are possible in light of the above teachings. It is therefore to be understood that within the scope of the appended claims, the present invention may be practiced otherwise that as specifically described herein.

What is claimed is:

1. A method for starting an image forming apparatus capable of reading a region outside a file system included in a card type memory, in which a recovery program for recovering a processing program, configured to execute image formation, of the image forming apparatus and a first boot loader program for starting the image forming apparatus and the recovery program are stored outside the file system included in the card type memory, said method comprising:

checking, by the image forming apparatus, whether recovery of the processing program is needed using the first boot loader program;

loading, by the image forming apparatus, the processing program in the memory section of the image forming apparatus, when it is determined that the recovery is not needed by the checking step;

starting a second boot loader program included in the loaded processing program;

starting an operating system included in the loaded processing program;

starting an image formation program included in the loaded processing program;

starting a rescue operating system included in the recovery program; and starting a rescue program included in the recovery program when it is determined that the recovery is needed by the checking step.

2. The method according to claim 1, further comprising:

starting a normal operating system included in the processing program; and starting various programs included in the processing program and needed in normal image formation when it is determined the recovery is not needed by the checking step.

3. The method according to claim 1, further comprising:

loading the recovery program in the memory section of the image forming apparatus after the checking step.

* * * * *